United States Patent
Li

(10) Patent No.: US 11,894,948 B2
(45) Date of Patent: Feb. 6, 2024

(54) METHOD OF FORMING A VIRTUAL NETWORK

(71) Applicant: PrimeWan Limited, Causeway Bay (HK)

(72) Inventor: Ming Li, Beijing (CN)

(73) Assignee: PrimeWan Limited, Causeway Bay (HK)

( * ) Notice: Subject to any disclaimer, the term of this patent is extended or adjusted under 35 U.S.C. 154(b) by 0 days.

(21) Appl. No.: 16/907,075

(22) Filed: Jun. 19, 2020

(65) Prior Publication Data

US 2021/0314191 A1 Oct. 7, 2021

Related U.S. Application Data

(63) Continuation-in-part of application No. 16/872,153, filed on May 11, 2020, now Pat. No. 11,362,865, which is a continuation-in-part of application No. 16/868,345, filed on May 6, 2020, now Pat. No. 11,245,645, which is a continuation-in-part of application No. 16/838,965, filed on Apr. 2, 2020, now Pat. No. 11,223,569.

(51) Int. Cl.
*H04L 12/46* (2006.01)
*H04B 10/27* (2013.01)
*H04L 45/74* (2022.01)
*H04B 10/25* (2013.01)

(52) U.S. Cl.
CPC ......... *H04L 12/4641* (2013.01); *H04B 10/25* (2013.01); *H04B 10/27* (2013.01); *H04L 45/74* (2013.01); *H04L 2212/00* (2013.01)

(58) Field of Classification Search
CPC . H04L 12/4641; H04L 45/74; H04L 2212/00; H04B 10/25; H04B 10/27
See application file for complete search history.

(56) References Cited

U.S. PATENT DOCUMENTS

| | | | |
|---|---|---|---|
| 6,798,769 B1 * | 9/2004 | Farmwald | H04M 7/121 370/352 |
| 6,850,518 B1 | 2/2005 | Khanna | |
| 7,817,656 B1 * | 10/2010 | Deng | H04L 47/629 370/412 |

(Continued)

FOREIGN PATENT DOCUMENTS

| | | |
|---|---|---|
| CN | 1207232 | 2/1999 |
| CN | 1677951 | 10/2005 |

(Continued)

OTHER PUBLICATIONS

K. Muthukrishnan et al., "A Core MPLS IP VPN Architecture," Network Working Group, Request for Comments: 2917, Core VPNs, The Internet Society, Sep. 2000, pp. 1-16.

(Continued)

*Primary Examiner* — Tanya T Motsinger

(57) ABSTRACT

A method of forming a virtual network includes forming an arrangement of virtual fibers from physical fiber optic cables that interconnect virtual entry devices, virtual forwarding devices, and virtual exit devices together. The virtual entry devices combine data and frames to allow a number of sources with data and frame rates that are less than a predetermined frame rate of a physical port to be output from the physical port.

16 Claims, 24 Drawing Sheets

(56) References Cited

U.S. PATENT DOCUMENTS

| | | |
|---|---|---|
| 9,590,820 B1 | 3/2017 | Shukla |
| 9,806,845 B1* | 10/2017 | Bernard .............. H04J 14/0282 |
| 9,860,011 B2 | 1/2018 | Kim et al. |
| 9,906,451 B2* | 2/2018 | DeCusatis .............. H04L 45/38 |
| 10,291,519 B2* | 5/2019 | Baba ........................ H04L 43/08 |
| 2003/0118036 A1 | 6/2003 | Gibson et al. |
| 2004/0218099 A1* | 11/2004 | Washington ... H04N 21/234381 348/571 |
| 2005/0226156 A1* | 10/2005 | Keating ................... H04L 47/10 370/235 |
| 2007/0153697 A1 | 7/2007 | Kwan et al. |
| 2008/0313684 A1* | 12/2008 | Batalden .............. H04N 21/845 725/97 |
| 2010/0166009 A1 | 7/2010 | Huang et al. |
| 2012/0027014 A1 | 2/2012 | Mack-Crane et al. |
| 2012/0045211 A1* | 2/2012 | Tan ........................ H04J 14/028 398/66 |
| 2012/0093034 A1 | 4/2012 | Kamath et al. |
| 2012/0163373 A1 | 6/2012 | Lo et al. |
| 2012/0230680 A1* | 9/2012 | Fujita ................. H04B 10/0793 398/25 |
| 2012/0287786 A1 | 11/2012 | Kamble et al. |
| 2013/0229921 A1 | 9/2013 | Mohan et al. |
| 2014/0328158 A1* | 11/2014 | Shao ........................ H04L 45/10 370/218 |
| 2015/0063122 A1* | 3/2015 | Chiang ................. H04W 40/22 370/238 |
| 2015/0071122 A1 | 3/2015 | Addanki et al. |
| 2015/0103673 A1* | 4/2015 | Shimada ............. H04L 43/0811 370/241.1 |
| 2015/0127805 A1* | 5/2015 | Htay ........................ H04L 47/70 709/224 |
| 2015/0156250 A1 | 6/2015 | Varshney et al. |
| 2016/0021332 A1* | 1/2016 | Hines ................... G11B 27/326 386/201 |
| 2016/0164781 A1* | 6/2016 | Imai ........................ H04L 47/72 370/252 |
| 2017/0019430 A1 | 1/2017 | Cohn |
| 2017/0163900 A1* | 6/2017 | Gaetje ..................... G02C 7/12 |
| 2017/0208315 A1* | 7/2017 | Rajak ................... H04N 13/161 |
| 2017/0244485 A1* | 8/2017 | Colonna ............ H04Q 11/0001 |
| 2018/0083698 A1* | 3/2018 | Hino .................. H04B 10/0793 |
| 2018/0309690 A1* | 10/2018 | Spiker ..................... H04L 47/34 |
| 2019/0020537 A1 | 1/2019 | Sharma et al. |
| 2019/0260474 A1* | 8/2019 | Takeshita ............. H04J 14/0267 |
| 2022/0206102 A1* | 6/2022 | Brown .................. G01S 5/0247 |

FOREIGN PATENT DOCUMENTS

| | | |
|---|---|---|
| CN | 1852285 | 10/2006 |
| CN | 1946053 | 4/2007 |
| CN | 101286922 | 10/2008 |
| CN | 102238091 | 11/2011 |
| CN | 103107932 | 5/2013 |
| CN | 103209110 | 7/2013 |
| CN | 103326940 | 9/2013 |
| CN | 103428061 | 12/2013 |
| CN | 105978656 | 9/2016 |
| CN | 107135133 | 9/2017 |
| CN | 110213040 | 9/2019 |
| KR | 20060059877 | 6/2006 |
| WO | 2015127643 | 9/2015 |

OTHER PUBLICATIONS

Ren Jin-qiu et al., "Implementation of Inter-AS BGP/MPLS VPN in High-performance Router," Computer Engineering, vol. 35, No. 3, Feb. 2009, pp. 126-129.

Chen Yingying et al., "Research on Virtual Router and Its Application in BGP/MPLS VPN," Computer Engineering, vol. 33, No. 1, Jan. 2007, pp. 108-111.

* cited by examiner

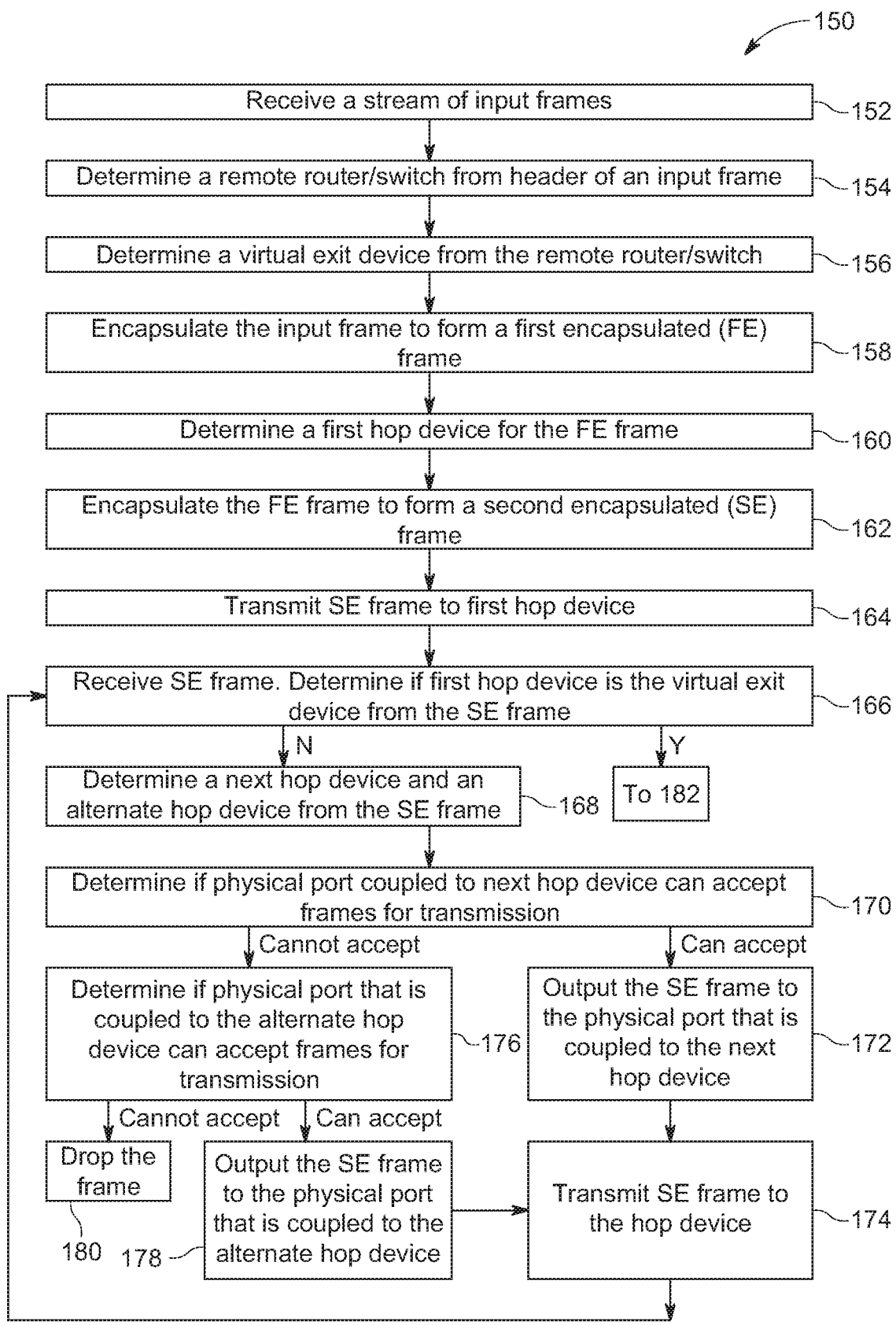
FIG. 1B1

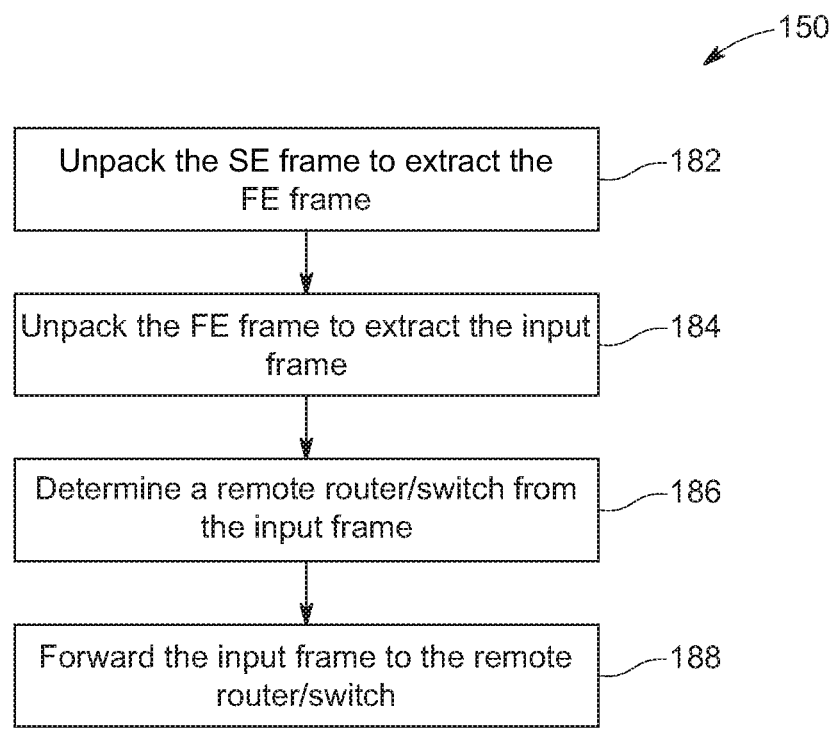
FIG. 1B2

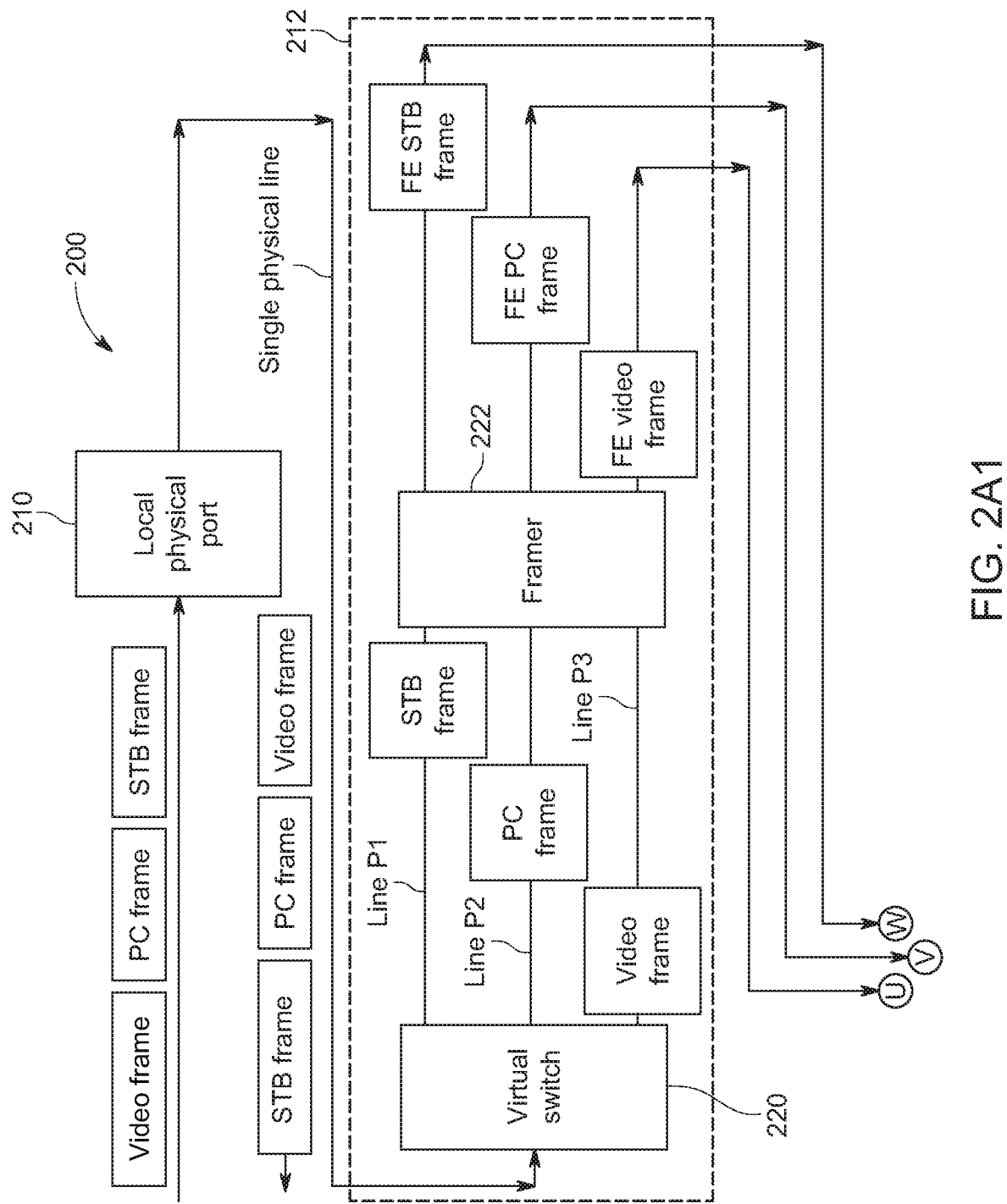
FIG. 2A1

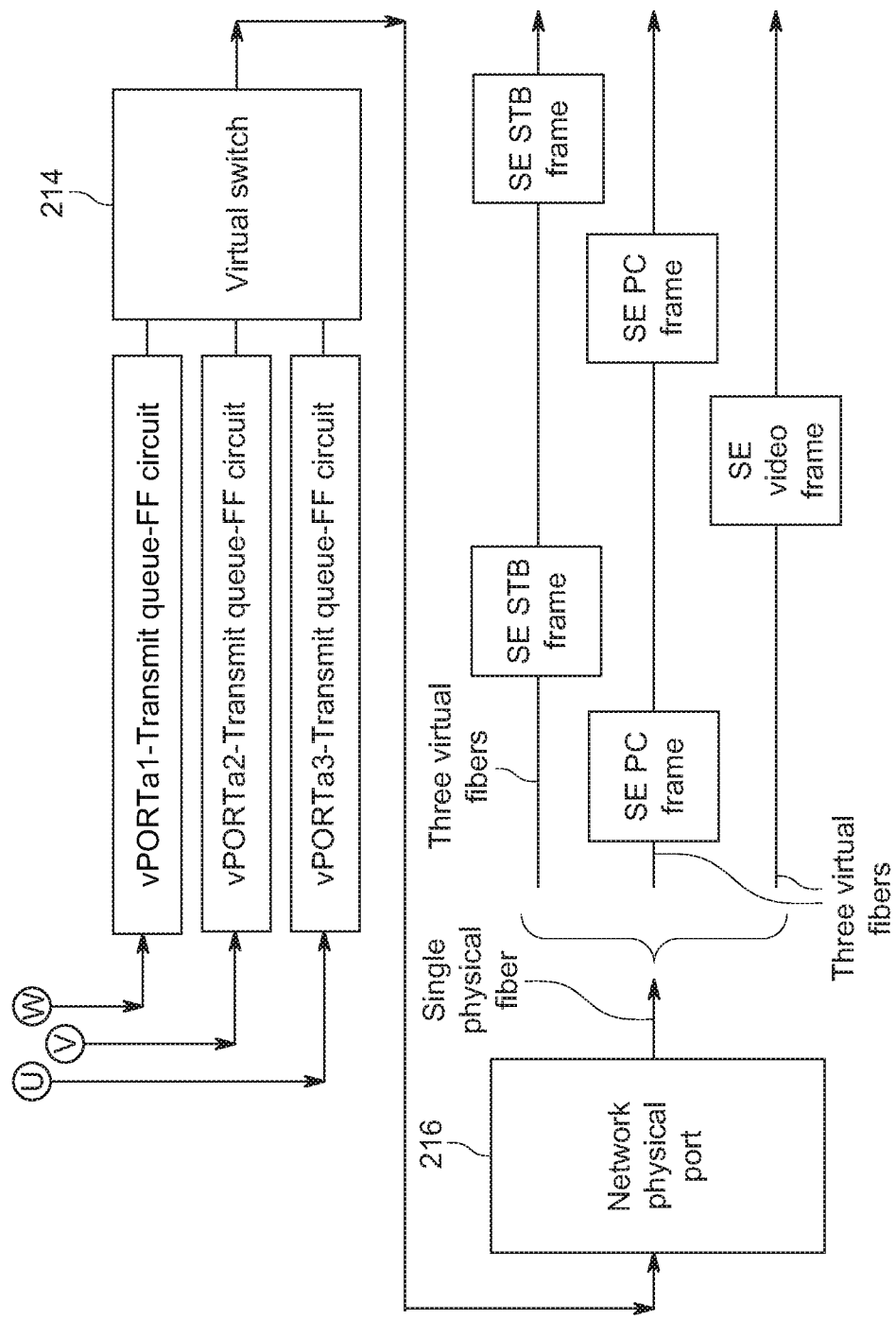
FIG. 2A2

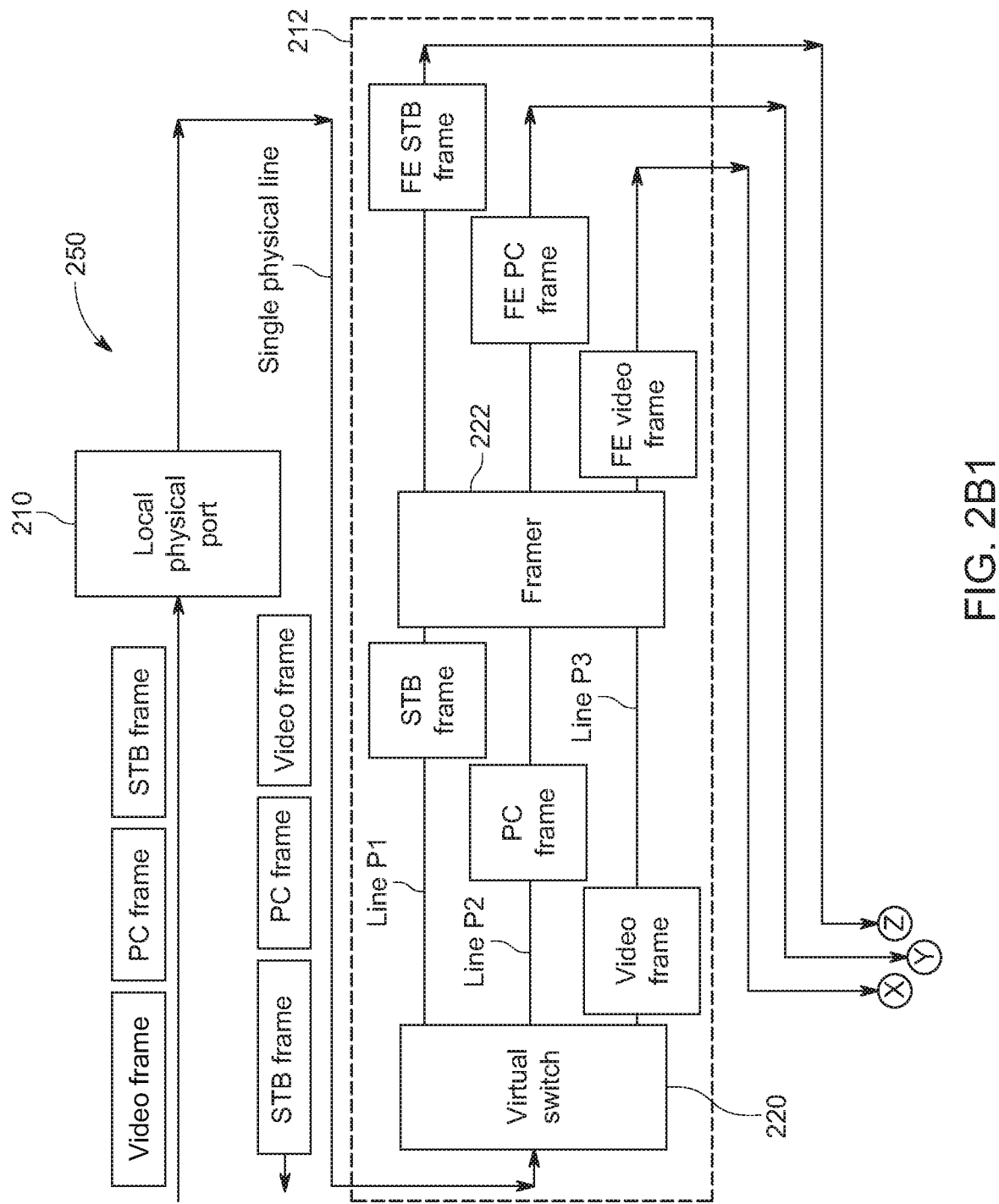
FIG. 2B1

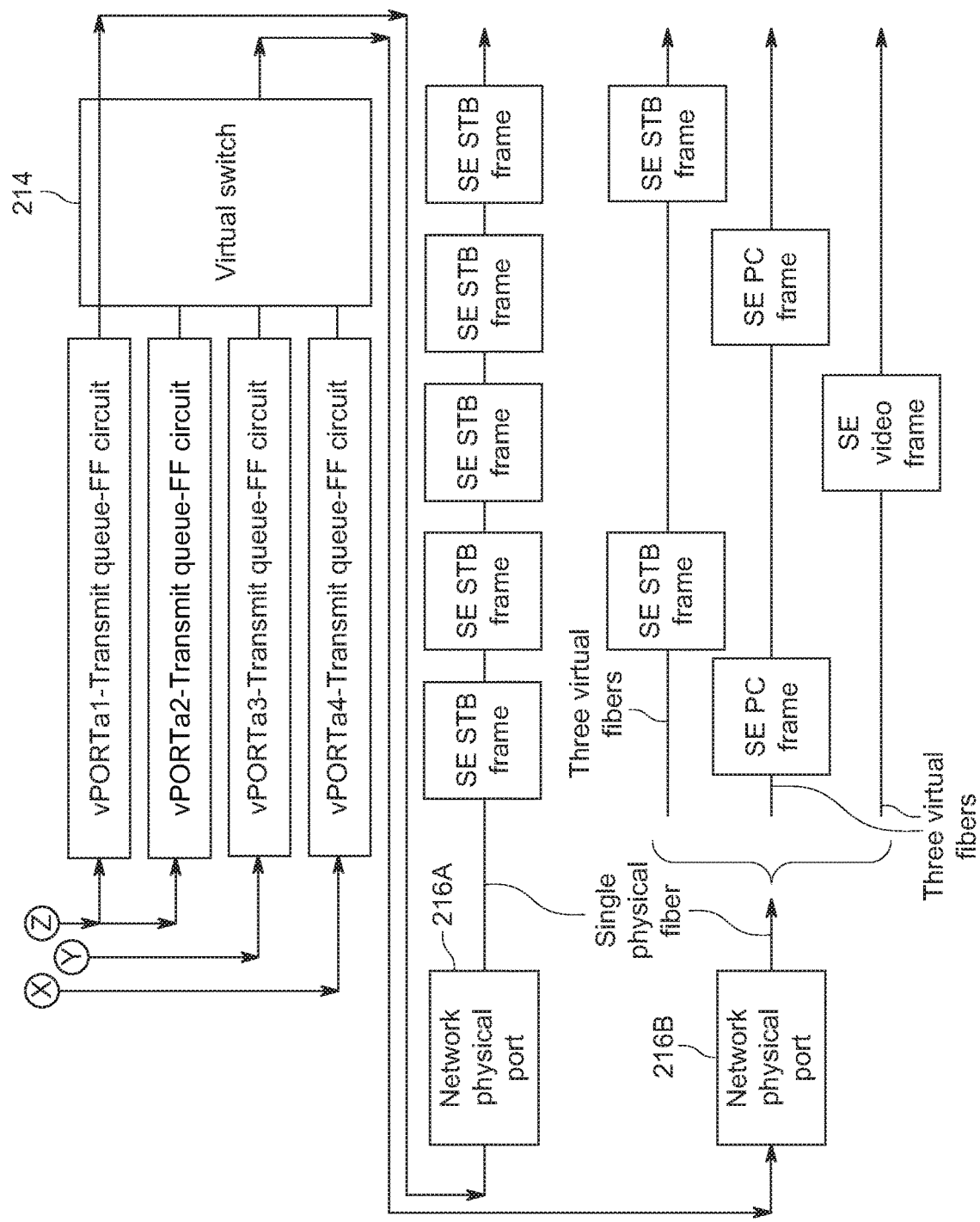
FIG. 2B2

METHOD OF FORMING A VIRTUAL NETWORK

RELATED APPLICATION

The present application is a continuation-in-part of U.S. patent application Ser. No. 16/872,153, filed on May 11, 2020, which is a continuation-in-part of U.S. patent application Ser. No. 16/868,345 filed on May 6, 2020, which is a continuation-in-part of U.S. patent application Ser. No. 16/838,965 filed on Apr. 2, 2020.

BACKGROUND OF THE INVENTION

1. Field of the Invention

The present application relates to the field of computer networks and, in particular, to a method of forming a virtual network.

2. Description of the Related Art

A wide area network (WAN) is an interconnected web of network devices that typically interconnects local area networks or metropolitan area networks over a large geographical area, such as across the state or across the country. WANs allow remotely located computers to communicate with each other via the network devices.

Conventional network devices typically include one or more physical network ports that operate at a predetermined fixed data rate, such as for example, 10/100/1000 Mbps (megabits per second), 10 Gbps (gigabits per second), 40 Gbps, and 100 Gbps connection. As part of enabling communication between the computer systems over a network, conventional network devices negotiate the transfer speed of a network port and, during that process, the transfer speed of the network port is fixed.

One of the disadvantages of conventional network devices is that there is often a requirement for more physical ports than are available, which results in reduced service or costly upgrades. As a result, there is a need for an approach to accommodating the increasing need for ports.

SUMMARY OF THE INVENTION

The present invention provides a virtual network that provides data and frame rate flexibility. The present invention includes a method of forming a virtual network that includes passing frames of data at a frame rate across one or more fiber optic cables that each has two or more physical fibers. When the frame rate of the frames of data is greater than a maximum frame rate of a first physical fiber in a fiber optic cable, the passing includes passing a first number of the frames of data over the first physical fiber at a first data rate that is equal to or less than a maximum data rate of the first physical fiber, and passing a second number of the frames of data over a second physical fiber at a second data rate that is equal to or less than a maximum data rate of the second physical fiber. When the frame rate of the frames of data is equal to or less than the frame rate of the first physical fiber in the fiber optic cable, the passing includes passing a pair of frames of data in sequence through the first physical fiber such that the pair of frames include data from a plurality of sources.

The present invention also includes a virtual forwarding device that forwards frames to a virtual exit device via an alternate path when the principal path forward frames at a rate that is less than the rate that frames could be received. The virtual forwarding device of the present invention includes a receive physical port that receives a second encapsulated frame, a transmit physical port to be coupled to a next hop device, an alternate physical port to be coupled to an alternate hop device, and a virtual port that is coupled to the receive physical port, the transmit physical port, and the alternate physical port. The virtual port to receive the second encapsulated frame from the receive physical port, unpack the second encapsulated frame to extract a first encapsulated frame, and extract an identifier of a virtual exit device from the first encapsulated frame. The virtual port to further determine a next hop device and an alternate hop device from the identifier, and determine whether the transmit physical port can accept frames for forwarding. When the transmit physical port can accept frames for forwarding, encapsulate the first encapsulated frame to form a third encapsulated frame, and forward the third encapsulated frame to the transmit physical port. The third encapsulated frame has a header than identifies the next hop device. When the transmit physical port cannot accept frames for forwarding, determine whether the alternate physical port can accept frames for forwarding.

The present invention further includes a method of operating a virtual forwarding device. The method includes receiving a second encapsulated frame, unpacking the second encapsulated frame to extract a first encapsulated frame, and extracting an identifier of a virtual exit device from the first encapsulated frame. The method further includes determining a next hop device and an alternate hop device from the identifier, and determining whether a transmit physical port coupled to the next hop device can accept frames for forwarding. The method also includes when the transmit physical port coupled to the next hop device can accept frames for forwarding, encapsulating the first encapsulated frame to form a third encapsulated frame, and forwarding the third encapsulated frame to the transmit physical port coupled to the next hop device. The third encapsulated frame has a header that identifies the next hop device. The method additionally includes when the transmit physical port coupled to the next hop device cannot accept frames for forwarding, determining whether a transmit physical port coupled to the alternate hop device can accept frames for forwarding.

The present invention also provides a non-transitory computer-readable storage medium having embedded therein program instructions, which when executed by a processor causes the processor to execute a method of operating a virtual forwarding device. The method includes receiving a second encapsulated frame, unpacking the second encapsulated frame to extract a first encapsulated frame, and extracting an identifier of a virtual exit device from the first encapsulated frame. The method further includes determining a next hop device and an alternate hop device from the identifier, and determining whether a transmit physical port coupled to the next hop device can accept frames for forwarding. The method also includes when the transmit physical port coupled to the next hop device can accept frames for forwarding, encapsulating the first encapsulated frame to form a third encapsulated frame, and forwarding the third encapsulated frame to the transmit physical port coupled to the next hop device. The third encapsulated frame has a header that identifies the next hop device. The method additionally includes when the transmit physical port coupled to the next hop device cannot accept frames for forwarding, determining whether a transmit physical port coupled to the alternate hop device can accept frames for forwarding.

A better understanding of the features and advantages of the present invention will be obtained by reference to the following detailed description and accompanying drawings which set forth an illustrative embodiment in which the principals of the invention are utilized.

BRIEF DESCRIPTION OF THE DRAWINGS

FIGS. 1B1-1B2 are a flow chart illustrating a method 150 of operating virtual network 100 in accordance with the present invention.

FIG. 2A is a block diagram illustrating an example of a transmit circuit 200 in accordance with the present invention.

FIG. 2B is a block diagram illustrating an example of a transmit circuit 250 in accordance with the present invention.

A better understanding of the features and advantages of the present invention will be obtained by reference to the following detailed description and accompanying drawings which set forth an illustrative embodiment in which the principals of the invention are utilized.

DETAILED DESCRIPTION OF THE INVENTION

Figure 1A:
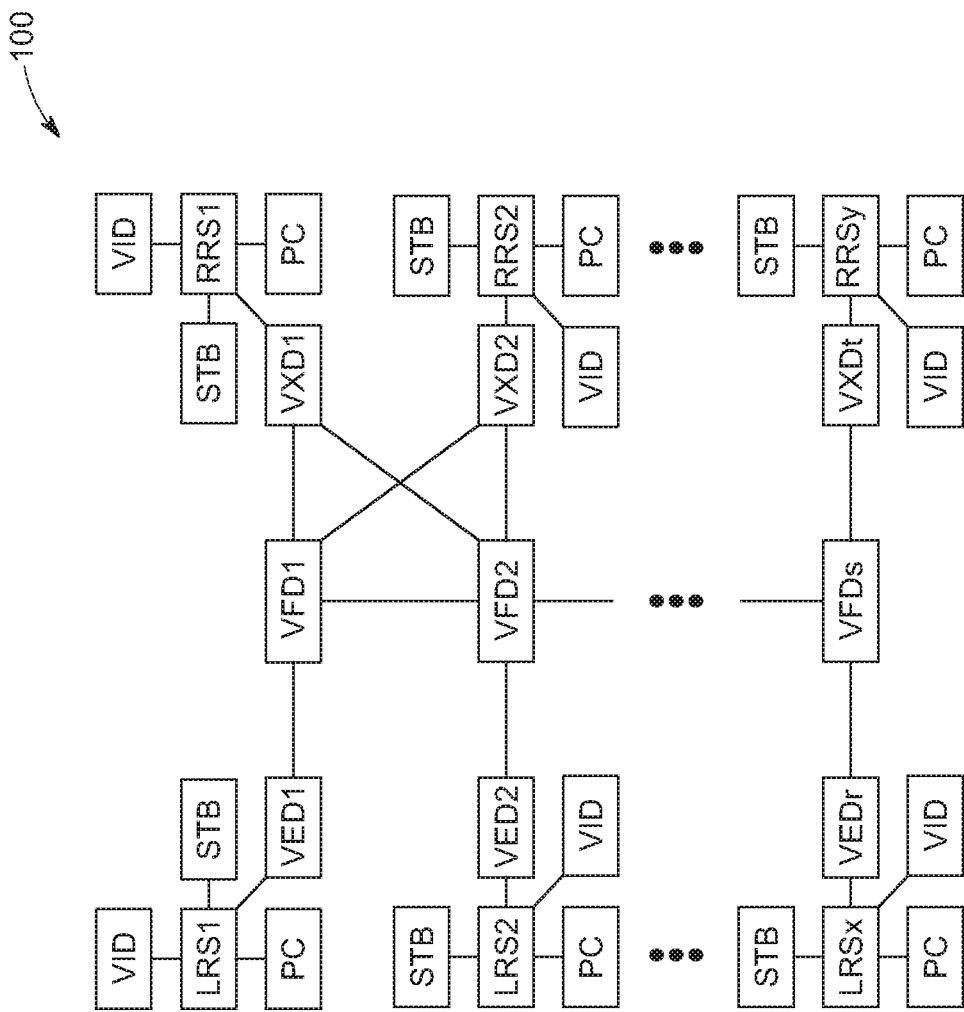
FIG. 1A is a block diagram illustrating an example of a virtual network 100 in accordance with the present invention.

FIG. 1A shows a block diagram that illustrates an example of a virtual network 100 in accordance with the present invention. As shown in FIG. 1A, virtual network 100 includes a number of virtual entry devices VED1-VEDr, a number of virtual forwarding devices VFD1-VFDs that are coupled to the virtual entry devices VED1-VEDr via fiber optic cables, and a number of virtual exit devices VXD1-VXDt that are coupled to the virtual forwarding devices VFD1-VFDs via fiber optic cables to form a web of interconnected devices.

Virtual network 100 interconnects a number of local devices, such as local router/switches LRS1-LRSx, with a number of remote devices, such as remote router/switches RRS1-RRSy. In the present example, the local router/switches LRS are coupled to a number of user devices, such as a set-top box (STB), a personal computer (PC), and a video device (VID), while the remote router/switches RRS are similarly coupled to a number of user devices.

FIGS. 1B1-1B2 show a flow chart that illustrates a method 150 of operating virtual network 100 in accordance with the present invention. As shown in FIG. 1B1, method 150 begins at 152 where a virtual entry device VED receives a stream of input frames, such as STB, PC, and video frames, from a local router/switch. Each input frame, in turn, has a header that identifies a remote device, such as a remote router/switch RRS. For example, virtual entry device VED1 can receive a stream of input frames from local router/switch LRS1, where each input frame has a header that identifies remote router/switch RRS1.

Figure 1C:
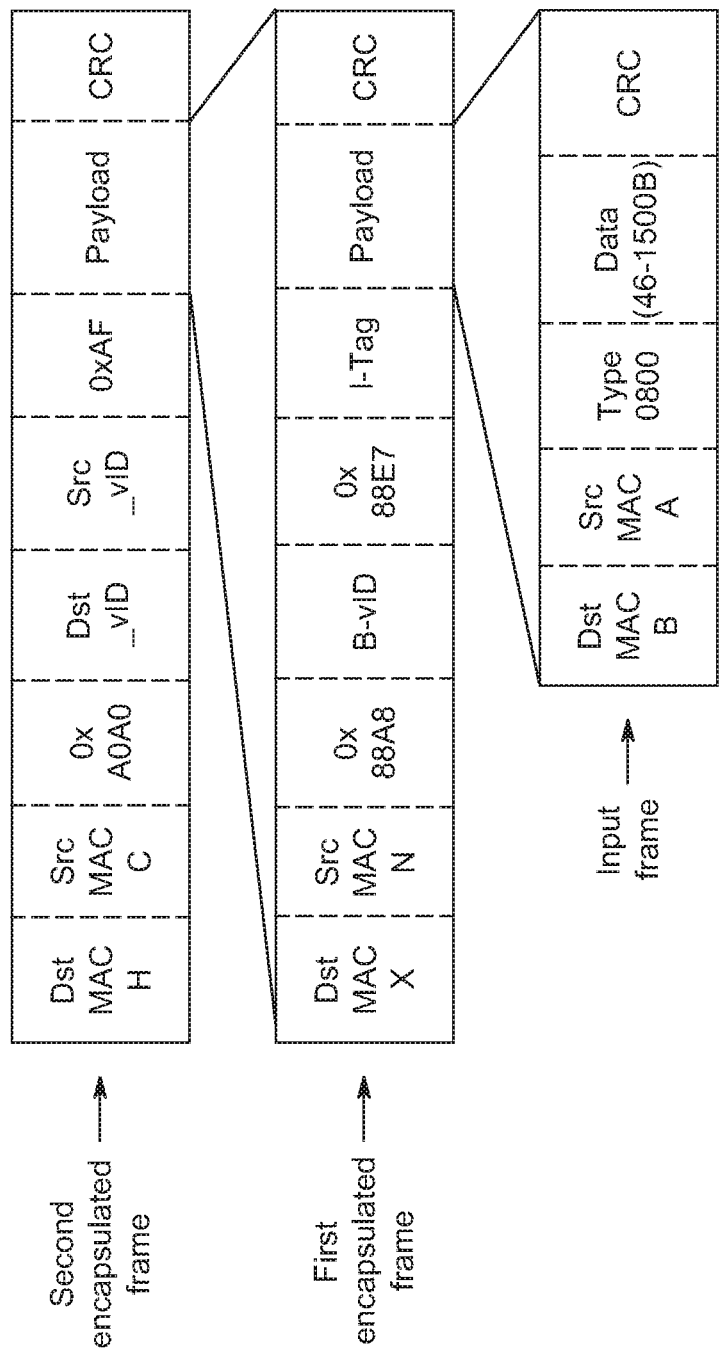
FIG. 1C is a diagram illustrating examples of frames in accordance with the present invention.

FIG. 1C shows a diagram that illustrates examples of frames in accordance with the present invention. As shown in FIG. 1C, an input frame has a header that includes a Src MAC A field that identifies the MAC address of a local router/switch, such as local router/switch LRS1, and a Dist MAC B field that identifies the MAC address of a remote router/switch, such as remote router/switch RRS1. The input frame also includes other fields, such as a type field, a data field, and an error correction (CRC) field.

Referring again to FIG. 1B1, method 150 next moves to 154 where the virtual entry device VED determines a remote router/switch from the header of an input frame. After this, method 150 moves to 156 to determine the virtual exit device VXD that is coupled to the remote router/switch RRS from the identity of the remote router/switch RRS. For example, the MAC address of remote router/switch RRS1, taken from the Dist MAC B field, can be used to identify the MAC address of virtual exit device VXD1, which is coupled to remote router/switch RRS1, via a lookup table.

After determining the virtual exit device VXD, method 150 moves to 158 where the virtual entry device VED encapsulates the input frame to form a first encapsulated (FE) frame. The FE frame, in turn, has a field that identifies the virtual exit device, which is virtual exit device VXD1 in the present example, and a field that includes the input frame. The encapsulation can be performed with a conventional protocol, such as the provider backbone bridge-traffic engineering (PBB-TE) protocol or the transport multiprotocol label switching (T-MPLS) protocol.

As shown in FIG. 1C, a FE frame has a Dst MAC X field that identifies the MAC address of a virtual exit device VXD, such as virtual exit device VXD1, and a Src MAC N field that identifies the MAC address of a virtual entry device VED, such as virtual entry device VED1. The FE frame also includes other fields, such as an I-tag field, a payload field an includes an input frame, and a CRC field.

Referring again to FIG. 1B1, method 150 next moves to 160 where the virtual entry device determines a first hop device for the FE frame from the identity of the virtual exit device. The first hop device can be to a virtual exit device VXD or a virtual forwarding device VFD. For example, virtual entry device VED1 can input the MAC address of the virtual exit device VXD1 into a lookup table to determine the MAC address of the first hop device in virtual network 100. After this, method 150 moves to 162 where the virtual entry device encapsulates the FE frame to form a second encapsulated (SE) frame. Each SE frame, in turn, has a field that identifies a first hop device, and a field that includes the FE frame.

As shown in FIG. 1C, a SE frame has a Src MAC C field that identifies the MAC address of the current device which, in the present example is virtual entry device VED1, and a Dist MAC H field that identifies the MAC address of a first hop in virtual network 100 which, in the present example, is virtual forwarding device VFD1. The SE frame also includes a Dst vID field that identifies a virtual port of the virtual entry device, and a Src vID field that identifies a corresponding virtual port in the virtual exit device.

Referring again to FIG. 1B1, method 150 next moves to 164 where the virtual entry device VED transmits the SE frame to the first hop device which, in the present example, is to a virtual forwarding device VFD. For example, the virtual entry device VED1 can transmit the SE frame to the virtual forwarding device VFD1.

Method 150 next moves to 166 where the first hop device receives the SE frame, and determines whether the first hop device is the virtual exit device from the SE frame. When the first hop device is not the virtual exit device, method 150 moves to 168 to determine a next hop device and an alternate hop device. For example, the virtual forwarding device VFD1 can receive the SE frame, and determine that the virtual forwarding device VFD1 is not the virtual exit device.

Next, method 150 moves to 170 to determine if the physical port coupled to the next hop device can accept frames for transmission. When the physical port coupled to the next hop device can accept frames for transmission, method 150 moves to 172 to output the SE frame to the physical port coupled to the next hop device, and then to 174 to transmit the SE frame to the next hop device.

When in 170 the physical port coupled to the next hop device cannot accept frames for transmission, method 150 moves to 176 to determine if the physical port coupled to the alternate hop device can accept frames for transmission. When the physical port coupled to the alternate hop device can accept frames for transmission, method 150 moves to 178 to output the SE frame to the physical port coupled to the alternate hop device, and then to 174 to transmit the SE frame to the alternate hop device. Following this, method 150 returns to 166.

In the present example, the alternate hop device is the virtual forwarding device VFD2, which then performs elements 166 to 178 of FIG. 1B1 to forward a second encapsulated frame to the virtual exit device VXD1, or to another virtual forwarding device VFD.

As shown in FIG. 1B2, when in 166 the first hop device is the virtual exit device, method 150 moves to 182 to unpack the SE frame to extract the FE frame, and then to 184 to unpack the FE frame to extract the input frame. Method 150 next moves to 186 to determine a remote router/switch from the input frame, and then moves to 188 to transmit the input frame to the remote router/switch.

One of the advantages of the present invention is that the frames can be forwarded across virtual network 100 without reference to the MAC address of the remote router/switch.

Referring again to FIG. 1A, the virtual entry devices VED, the virtual forwarding devices VFD, and the virtual exit devices VXD have static forwarding tables that are administratively assigned. For example, each input frame, e.g., STB, PC, and video, includes the MAC address of a remote router/switch RRS. The identity of the virtual exit device VXD that is coupled to the remote router/switch RRS can be administratively assigned and provided to the virtual entry devices VED and the virtual exit devices such that the hops taken by a frame through virtual network 100 are preassigned.

FIG. 2A shows a block diagram that illustrates an example of a transmit circuit 200 of a virtual entry device in accordance with the present invention. As shown in FIG. 2A, transmit circuit 200 includes a local physical port 210, a framing circuit 212 that is coupled to local physical port 210, and a number of transmit virtual ports vPORTa1-vPORTan that are coupled to framing circuit 212.

Each transmit virtual port vPORTa, in turn, includes a transmit queue and a transmit frame formatting circuit. In addition, transmit circuit 200 also includes a transmit virtual switch 214 that is coupled to each of the transmit virtual ports vPORTa, and a network physical port 216 that is coupled to transmit virtual switch 214 and to a fiber optic cable.

Figure 3A:
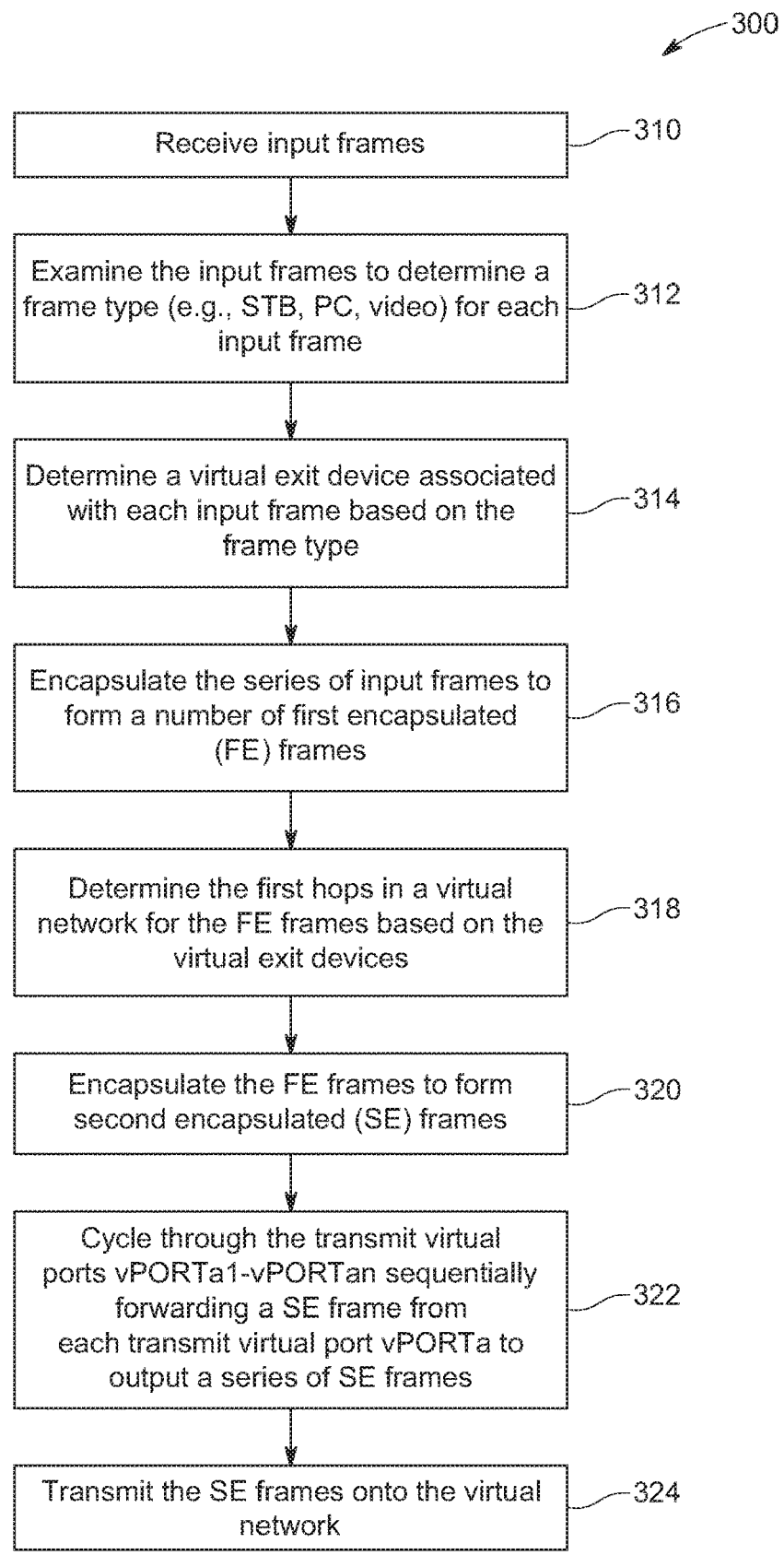
FIG. 3A is a flow chart illustrating an example of a method 300 of operating transmit circuit 200 in accordance with the present invention.

FIG. 3A shows a flow chart that illustrates an example of a method 300 of operating transmit circuit 200 in accordance with the present invention. As shown in FIG. 3A, method 300 begins at 310 with framing circuit 212 receiving a series of input frames from local physical port 210. Method 300 next moves to 312 to examine the series of input frames to determine a frame type (e.g., STB, PC, video) for each input frame, and then moves to 314 to determine a virtual exit device that is associated with each input frame based on the frame type. Each virtual exit device, in turn, has a number of receive virtual ports.

Following this, method 300 moves to 316 where framing circuit 212 encapsulates the series of input frames to form a number of first encapsulated (FE) frames. The FE frames have headers that identify the virtual exit devices that are associated with the series of input frames.

After this, method 300 moves to 318 where the transmit virtual ports vPORTa1-vPORTan determine the first hops in a virtual network for the FE frames based on the virtual exit devices in the headers of the FE frames. Next, method 300 moves to 320 where the transmit virtual ports vPORTa1-vPORTan encapsulate the FE frames to form second encapsulated (SE) frames. Each SE frame has a header that identifies a first hop of the SE frame. The header also identifies the receive virtual port of the associated virtual exit device of an input frame. In addition, the transmit virtual ports occupy a first portion of a shared memory.

Following this, method 300 moves to 322 where transmit virtual switch 214 cycles through the transmit virtual ports vPORTa1-vPORTan sequentially forwarding a SE frame from each transmit virtual port vPORTa in a fixed repeating order to output a sequence of SE frames. For example, virtual switch 214 can output a sequence of SE frames where the first SE frame is from vPORT1, the second frame is from vPORT2, the third frame is from vPORT3, and a fourth frame is again from vPORT1.

If a transmit virtual port vPORTa is empty or partially full, then no frame is generated. For example, if transmit virtual port vPORT2 is empty, then network physical port 216 outputs a frame sequence that includes frame 1, no frame, frame 3. Method 300 next moves to 324 where network physical port 216 transmits the SE frames onto the virtual network.

Figure 3B:
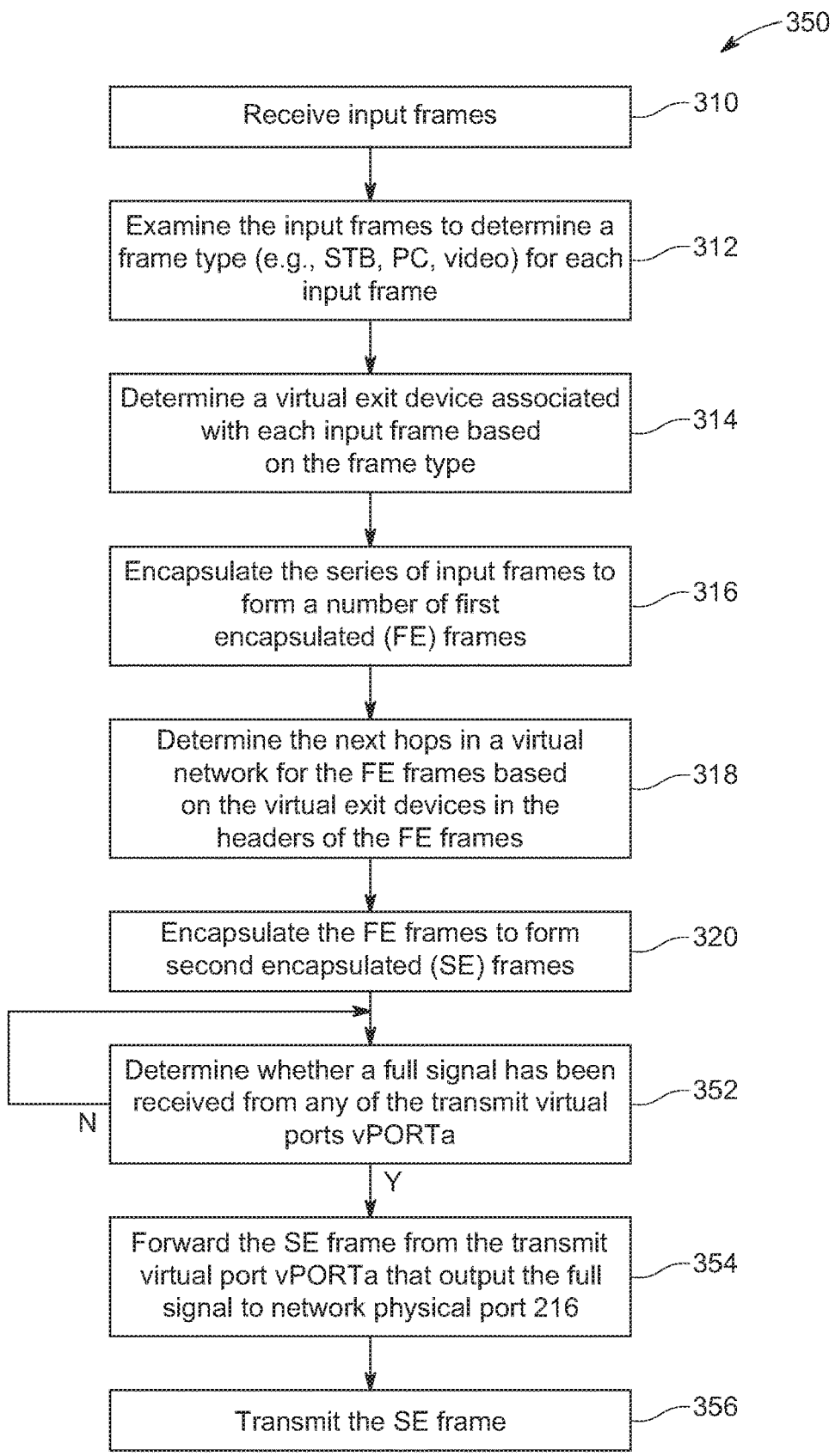
FIG. 3B is a flow chart illustrating an example of a method 350 of operating transmit circuit 200 in accordance with the present invention.

FIG. 3B shows a flow chart that illustrates an example of a method 350 of operating transmit circuit 200 in accordance with an alternate embodiment of the present invention. Method 350 is similar to method 300 and, as a result, utilizes the same reference numerals to designate the elements that are common to both methods.

As shown in FIG. 3B, method 350 first diverges from method 300 at 352 where virtual switch 214 determines whether a full signal has been received from any of the transmit virtual ports vPORTa. The full signal indicates that the SE frame in a transmit virtual port vPORTa is ready to be transmitted. When virtual switch 214 detects a full signal from a transmit virtual port vPORTa, method 350 moves to 354 where virtual switch 214 forwards the SE frame from the transmit virtual port vPORTa that output the full signal to network physical port 216.

For example, virtual switch 214 could sequentially receive a full signal from transmit virtual port vPORTa1, transmit virtual port vPORTa2, and transmit virtual port vPORTa3. In this case, virtual switch 214 outputs a sequence of SE frames where the first SE frame is from transmit virtual port vPORT1, the second frame is from transmit virtual port vPORT2, and the third frame is from transmit virtual port vPORT3.

Alternately, one of the sources (e.g., the STB, PC, video sources) can have a data rate that is much faster than the data rates of the other sources (e.g., STB, PC, video sources) which, in turn, causes one transmit virtual port vPORTa to output a full signal much more frequently than the other transmit virtual ports vPORTa.

For example, if network physical port 216 transmits frames at a frame rate of five frames per second, transmit virtual port vPORTa2 outputs frames at a rate that is 3× faster than each of the frame rates of transmit virtual ports vPORTa1 and vPORTa3, transmit virtual port vPORTa2 signals full three times before the other ports, and transmit virtual port vPORTa1 signals before vPORTa3 signals, then virtual switch 214 forwards a sequence of frames that includes a first frame from the transmit virtual port vPORT2, a second frame from transmit virtual port vPORT2, a third frame from transmit virtual port vPORT2, a fourth frame from transmit virtual port vPORT1, and a fifth frame from transmit virtual port vPORT3.

In addition to a first-in first-out approach where the order of receiving a full signal determines the order that a SE frame is output from a transmit virtual port vPORTa by virtual switch 214, the transmit virtual ports vPORTa-vPORTan can alternately include a priority scheme that allows frames to be forwarded from a transmit virtual port vPORTa to a network physical port in any amount and in any order.

Referring back to FIG. 3B, after virtual switch 214 forwards the SE frame from the transmit virtual port vPORTa that output the full signal to network physical port 216, method 350 moves to 356 where network physical port 216 transmits the SE frame. In method 300, the frame to be output is predictable, whereas the frame to be output in method 350 is not predictable, although a priority scheme provides a level of predictability.

Referring again to the FIG. 2A example, framing circuit 212 includes a virtual switch 220 and a framer 222 that is coupled to virtual switch 220. Virtual switch 220 detects a type of input frame (e.g., STB, PC, video), determines a route for a frame to a transmit virtual port vPORTa that corresponds with the type of frame from a static forwarding table, and outputs the frame towards the transmit virtual port vPORTa.

In the present example, virtual switch 220 receives the STB frame transmitted by a local source router/switch, such as router/switch 120, and detects the received frame to be a STB frame from the source and/or destination MAC address in the STB frame. Switch 220 then outputs the STB frame on a first virtual port line P1 routed towards transmit virtual port vPORTa1, which was pre-selected to receive STB frames.

Similarly, virtual switch 220 receives the PC frame transmitted by the local source router/switch, and detects the received frame to be a PC frame from the source and/or destination MAC address in the PC frame. Switch 220 then outputs the PC frame on a second virtual port line P2 routed towards transmit virtual port vPORTa2, which was pre-selected to receive PC frames.

Virtual switch 220 also receives the video frame transmitted by the local router/switch, detects the received frame to be a video frame from the source and/or destination MAC address in the video frame, and then outputs the video frame on a third virtual port line P3 routed towards transmit virtual port vPORTa3, which was pre-selected to receive video frames.

Framer 222 receives the STB frame on virtual port line P1, encapsulates the STB frame to form a first encapsulated (FE) STB frame, and then forwards the FE STB frame to the transmit queue of transmit virtual port vPORTa1. Similarly, framer 222 receives the PC frame on virtual port line P2, encapsulates the PC frame to form a first encapsulated (FE) PC frame, and then forwards the FE PC frame to the transmit queue of transmit virtual port vPORTa2. Framer 222 also receives the video frame on virtual port line P3, encapsulates the video frame to form a first encapsulated (FE) video frame, and then forwards the FE video frame to the transmit queue of transmit virtual port vPORTa3.

Framer 222 can utilize a conventional protocol, such as the provider backbone bridge-traffic engineering (PBB-TE) protocol or the transport multiprotocol label switching (T-MPLS) protocol, to generate the encapsulated frames. In addition, the FE STB frame, the FE PC frame, and the FE video frame each has a header which has a number of fields that include an identification of the virtual exit device.

For example, the header of a FE frame can include an exit address field for the MAC address of the virtual exit device, an I-Tag field, or a similar field. The header can also include other fields, such as the MAC address of the virtual entry device. In the present example, the MAC address of the virtual exit device is administratively provided to the virtual entry device.

With respect to the transmit virtual ports vPORTa, the frame formatting circuit in transmit virtual port vPORTa1 of transmit circuit 200 receives the FE STB frame, determines a first hop in the virtual network for the FE STB frame from a static forwarding table based on the identification of the virtual exit device, such as the MAC address of the virtual exit device, in the header of the FE STB frame, and encapsulates the FE STB frame to form a second encapsulated (SE) STB frame.

Similarly, the frame formatting circuit in transmit virtual port vPORTa2 of transmit circuit 200 receives the FE PC frame, determines a first hop in the virtual network for the FE PC frame from the static forwarding table based on the identification of the virtual exit device, such as the MAC address of the virtual exit device, in the header of the FE PC frame, and encapsulates the FE PC frame to form a second encapsulated (SE) PC frame.

In addition, the frame formatting circuit in transmit virtual port vPORTa3 of transmit circuit 200 receives the FE video frame, determines a first hop in the virtual network for the FE video frame from the static forwarding table based on the identification of the virtual exit device, such as the MAC address of the virtual exit device, in the header of the FE video frame, and encapsulates the FE video frame to form a second encapsulated (SE) video frame.

The SE STB frame, the SE PC frame, and the SE video frame each includes a header with a first hop field that identifies the MAC address of the first hop device in the virtual network, a source field Src_vID that identifies the virtual port number of the virtual entry device, and a destination field Dst_vID that identifies a virtual port number of the virtual exit device that corresponds with the virtual port number of the virtual entry device. In the present example, the source field Src_vID for the SE STB frame is transmit virtual port vPORTa1. Other fields can also be included.

Further, virtual switch 214 cycles through the transmit virtual ports vPORTa1-vPORTan sequentially forwarding a second encapsulated (SE) frame from each virtual port vPORTa to output a series of SE frames to physical port 216. In the present example, switch 214 forwards a SE STB frame from transmit virtual port vPORTa1 to physical port 216, followed by forwarding a SE PC frame from transmit virtual port vPORTa2 to physical port 216, followed by forwarding a SE video frame from transmit virtual port vPORTa3 to physical port 216, followed by forwarding a SE STB frame from virtual port vPORTa1 to physical port 216, and continuing in the same manner, with physical port 216 outputting the frames. Although FIG. 2 illustrates transmit circuit 200 as receiving and operating with input from a single local router/switch, transmit circuit 200 can alternately receive and operate with input from multiple router/switches.

FIG. 2B shows a block diagram that illustrates an example of a transmit circuit 250 in accordance with the present invention. Transmit circuit 250 is similar to transmit circuit 200 and, as a result, utilizes the same reference numerals to designate the elements that are common to both transmit circuit 200 and transmit circuit 250.

As shown in FIG. 2B, transmit circuit 250 differs from transmit circuit 200 in that transmit circuit 250 includes a first network physical port 216A and a second network physical port 216B, both of which are coupled to virtual switch 214. In addition, virtual switch 214 provides a continuous connection between transmit virtual port vPORTa1 and network physical port 216A. Further, an additional transmit virtual port vPORTa4 is shown.

Transmit circuit 250 operates substantially the same as transmit circuit 200, except that one or more of the sources (e.g., STB, PC, or video source) outputs frames of data at a frame rate that is greater than the maximum frame rate of the network physical ports 216A and 216B. For example, each of the network physical ports 216A and 216B can have a maximum frame rate of five frames per second.

In the FIG. 2B example, a set-top box outputs seven STB frames per second, while a personal computer outputs two PC frames per second and a video device outputs one video frame per second. (The numbers cited are for illustration purposes only.) As shown in FIG. 2B, five of the seven STB frames are transmitted from network physical port 216A, while the remaining two STB frames, two PC frames, and one video frame are transmitted from network physical port 216B in the manner illustrated by methods 300 and 350. One the advantages of transmit circuit 250 is that transmit circuit 250 can handle incoming frame rates that are greater than the maximum frame rate of the network physical ports.

Figure 2C:
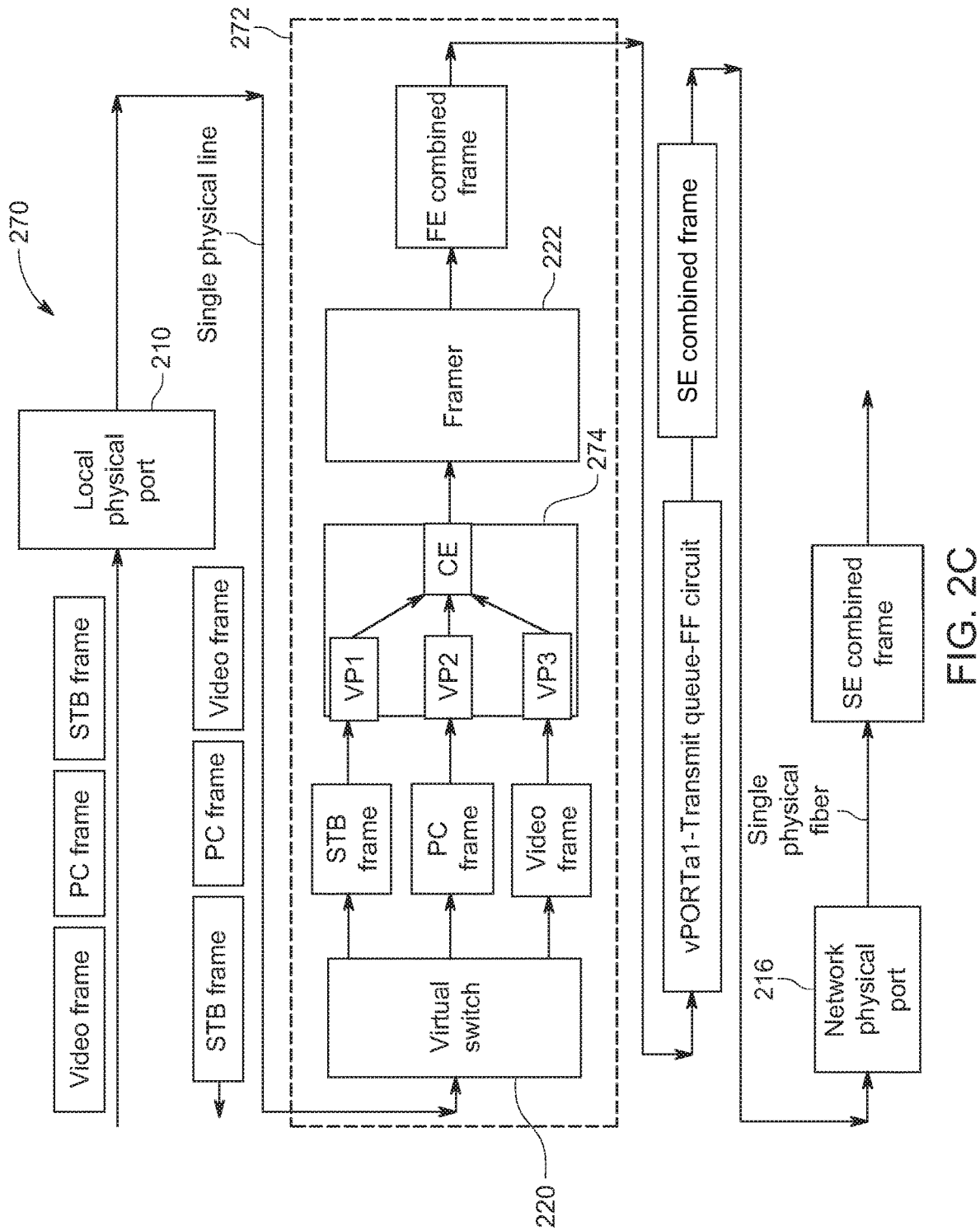
FIG. 2C is a block diagram illustrating an example of a transmit circuit 270 in accordance with the present invention.

FIG. 2C shows a block diagram that illustrates an example of a transmit circuit 270 in accordance with the present invention. Transmit circuit 270 is similar to transmit circuit 200 and, as a result, utilizes the same reference numerals to designate the structures that are common to both transmit circuit 200 and transmit circuit 270.

As shown in FIG. 2C, transmit circuit 270 differs from transmit circuit 200 in that transmit circuit 270 utilizes a framing circuit 272 in lieu of framing circuit 212. Framing circuit 272, in turn, is the same as framing circuit 212, except that framing circuit 272 includes a combiner 274 that combines data from the STB frame, the PC frame, and the video frame into a single combined frame.

Combiner 274 includes a number of framing virtual ports, such as framing virtual ports VP1-VP3, that correspond with the number of frame types, and a combination engine CE that combines data from the different framing virtual ports VP1-VP3 to generate a combined frame that is output to framer 222. The combination engine CE can be implemented in logic or in software.

In operation, combiner 274 receives a number of incoming frames of data from a number of sources at a number of non-standard data rates, such as STB frames from a first source at 20 Mbps, PC frames from a second source at 32 Mbps, and video frames from a third source at 48 Mbps, and stores the incoming frames in the framing virtual ports VP1-VP3 that correspond with the source of the frame, e.g., STB, PC, video.

Combiner 274 combines data from the STB, PC, and video frames stored in the framing virtual ports VP1-VP3 to output the combined frame at a data rate that is equal to or less than a predetermined fixed data rate (e.g., 100 Mbps) of the network physical port 216. For example, data from the STB frames at 20 Mbps, the data from the PC frames at 32 Mbps, and the data from the video frames at 48 Mbps are combined to generate combined frames at 100 Mbps, which is equal to the 100 Mbps predetermined fixed data rate in the example.

Figure 2D:
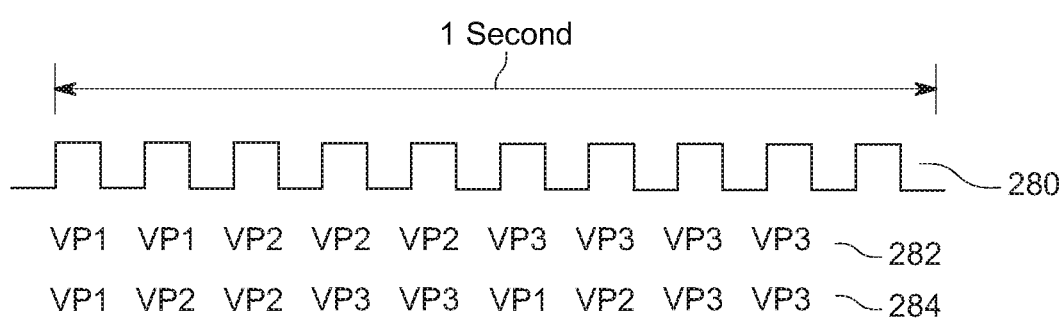
FIG. 2D is a timing diagram illustrating an example of the operation of combiner 274 in accordance with the present invention.

FIG. 2D shows a timing diagram that illustrates an example of the operation of combiner 274 in accordance with the present invention. In the FIG. 2D example, a transmit clock signal 280 is shown operating at a predetermined fixed rate of 10 cycles per second, along with the data from three framing virtual ports VP1, VP2, and VP3 that are clocked to selected pulses within the transmit clock signal 280.

If combiner 274 receives a first data stream of STB frames from a first source that has a non-predetermined data rate of 2 cycles per second, a second data stream of PC frames from a second source that has a non-predetermined data rate of 3 cycles per second, and a third data stream of video frames from a third source that has a non-predetermined data rate of 4 cycles per second, then, as illustrated by line 282, the combiner 274 clocks data from the first data stream to the first two clock cycles of the 10 predetermined fixed cycles per second, clocks data from the second data stream to the third, fourth, and fifth clock cycles of the 10 predetermined fixed cycles per second, and clocks data from the third data stream to the sixth, seventh, eighth, and ninth clock cycles of the 10 predetermined fixed cycles per second. The last cycle in this example is empty. Ideally, the incoming frames are grouped so that all of the predetermined fixed clock cycles are utilized.

In addition, as shown by line 284 in FIG. 2D, the data from the first data stream, the data from the second data stream, and the data from the third data stream can be clocked to any of the clock cycles of the 10 predetermined fixed cycles of the transmit clock signal 610. Any type of data, e.g., header, payload, and any amount of data, e.g., bit, byte, word, type, can be clocked to each pulse of the transmit clock signal 280. The FIG. 2D example is a simplified example to illustrate the timing.

Referring again to FIG. 2C, framer 222 identifies a remote device, e.g., a remote router/switch, from the header of the combined frame, and identifies a virtual exit device from the identity of the remote device. The combined frame is encapsulated by framer 222 to generate a FE combined frame that has a header that identifies the virtual exit device.

The FE combined frame is forwarded to a transmit virtual port vPORTa1 to determine a first hop in the virtual network for the FE frame based on the virtual exit device in the header of the FE frame. The transmit virtual port vPORTa1 also encapsulates the FE combined frame to form a second encapsulated (SE) frame that has a header that identifies a first hop of the SE frame. The transmit virtual port vPORTa1 forwards the SE frame to physical port 216, which outputs the SE combined frame.

Figure 4:
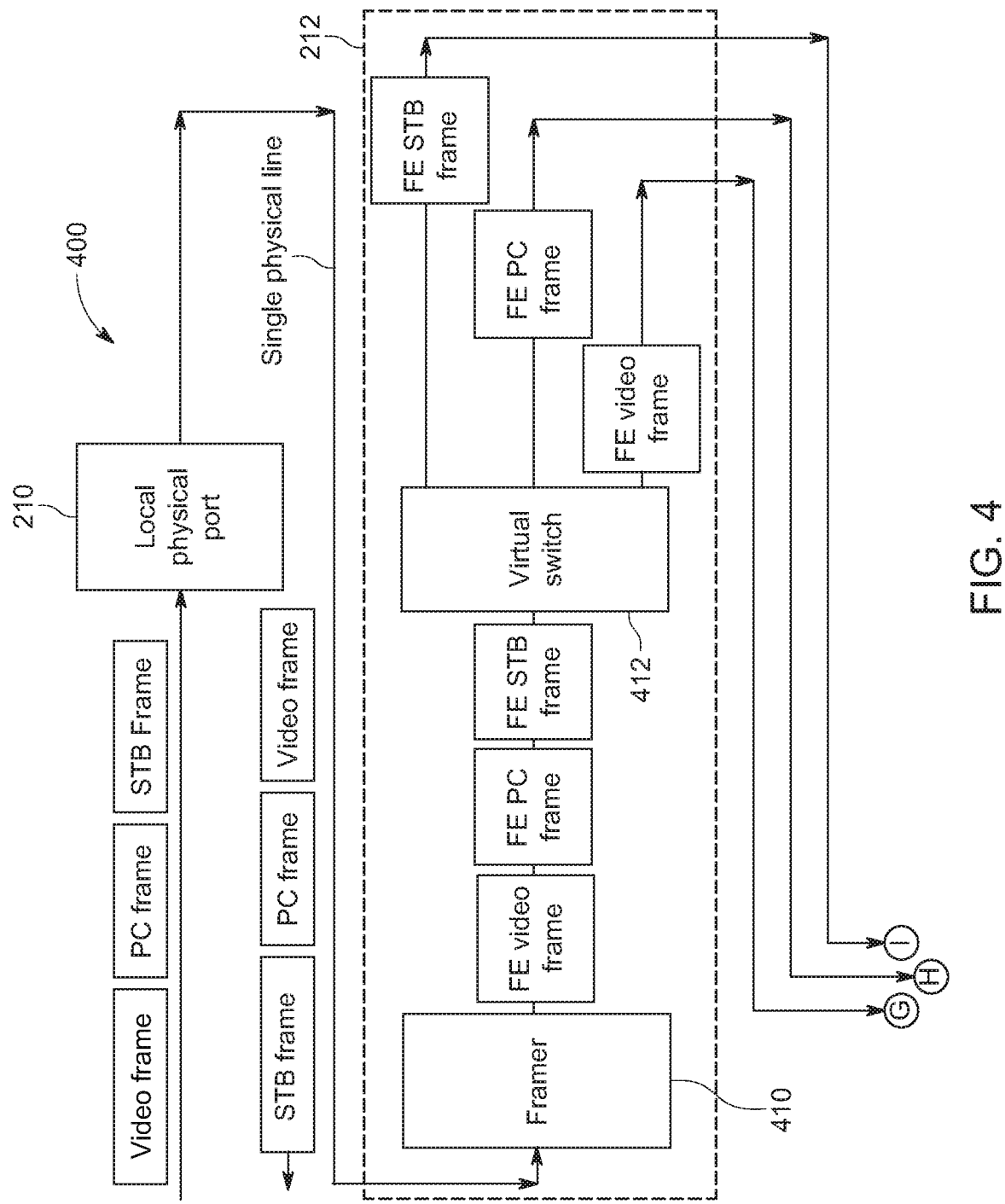
FIG. 4 is a block diagram illustrating an example of a transmit circuit 400 in accordance with an alternate embodiment of the present invention.
Figure 4:
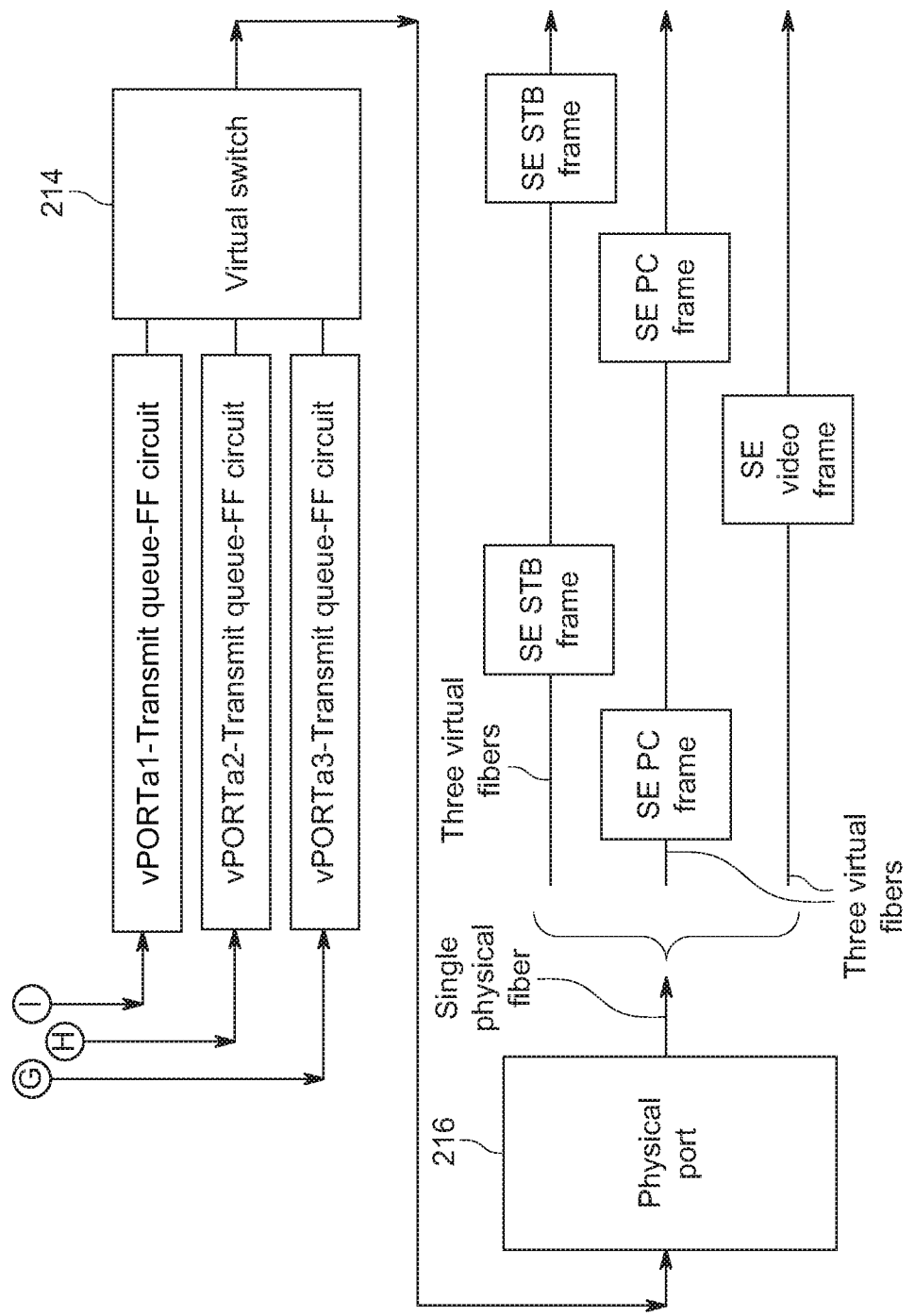

FIG. 4 shows a block diagram that illustrates an example of a transmit circuit 400 in accordance with an alternate embodiment of the present invention. Transmit circuit 400 is similar to transmit circuit 200 and, as a result, utilizes the same reference numerals to designate the structures that are common to both circuits.

As shown in FIG. 4, transmit circuit 400 differs from transmit circuit 200 in that framing circuit 212 of transmit circuit 400 utilizes a serial-to-serial framer 410 followed by a serial-to-parallel virtual switch 412 that is coupled to the virtual ports vPORTa1-vPORTan in lieu of virtual switch 220 followed by framer 222. In a further alternate embodiment, framer 410 and virtual switch 412 of transmit circuit 400 can be physically separated, with framer 410 being incorporated into a local router/switch.

Figure 5:
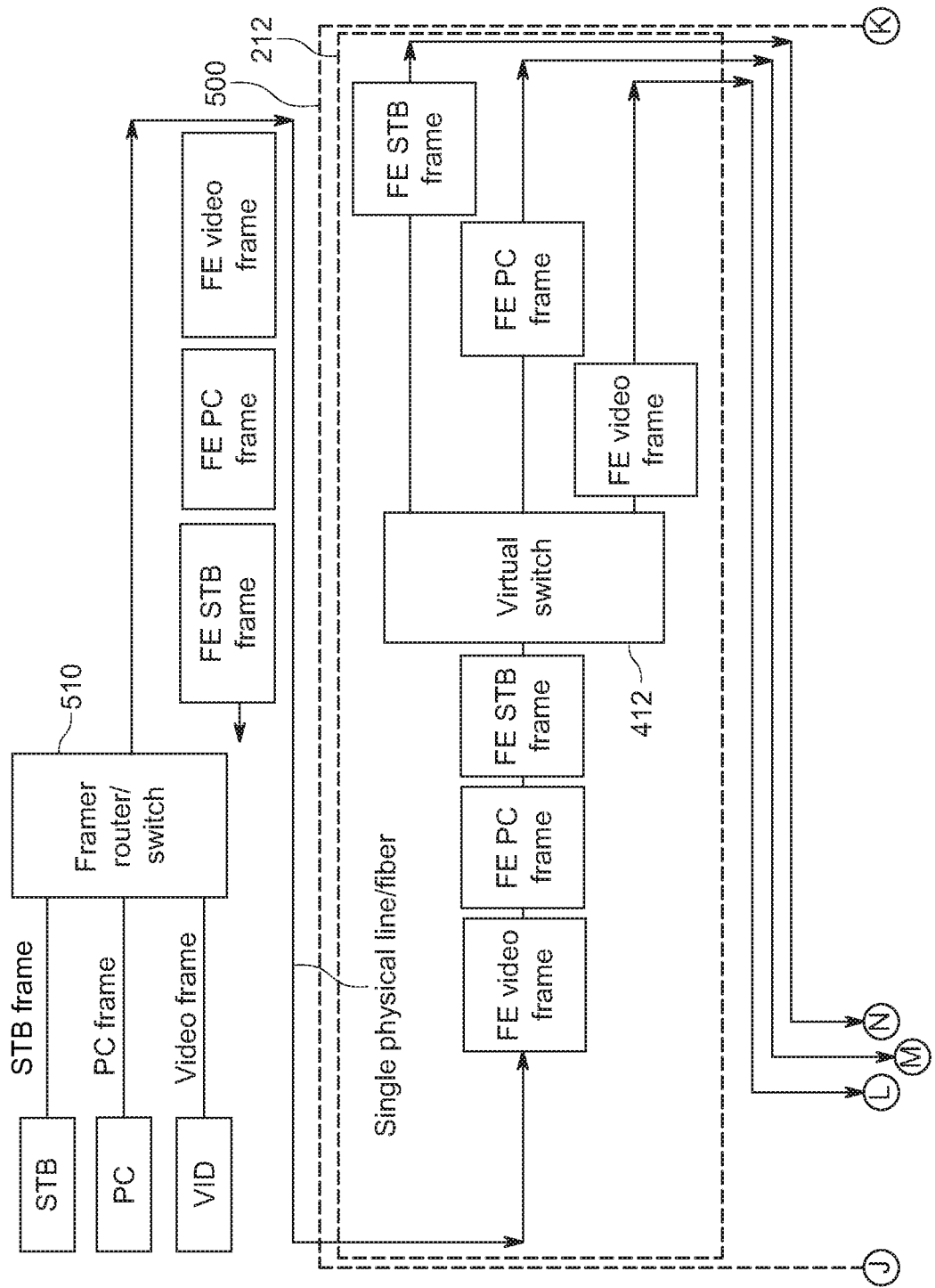
FIG. 5 shows a block diagram that illustrates an example of a transmit circuit 500 in accordance with an alternate embodiment of the present invention.
Figure 5:
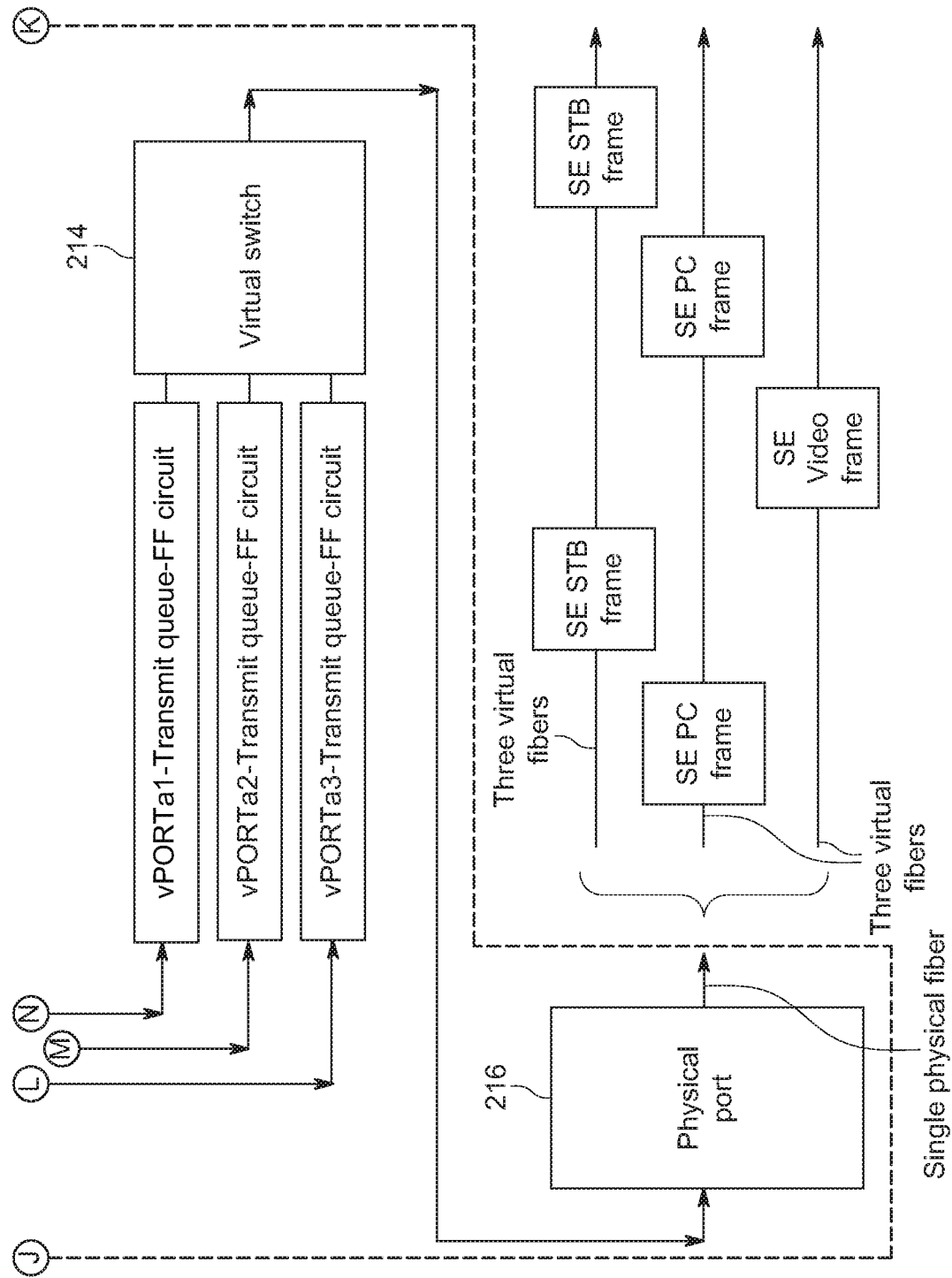

FIG. 5 shows a block diagram that illustrates an example of a transmit circuit 500 in accordance with the present invention. Transmit circuit 500 is similar to transmit circuit 400 and, as a result, utilizes the same reference numerals to designate the structures that are common to both circuit 400 and circuit 500. As shown in the example illustrated in FIG. 5, a local framer router/switch 510 is utilized with transmit circuit 500 in lieu of a local router/switch that receives and outputs STB, PC, and video frames.

Figure 6:
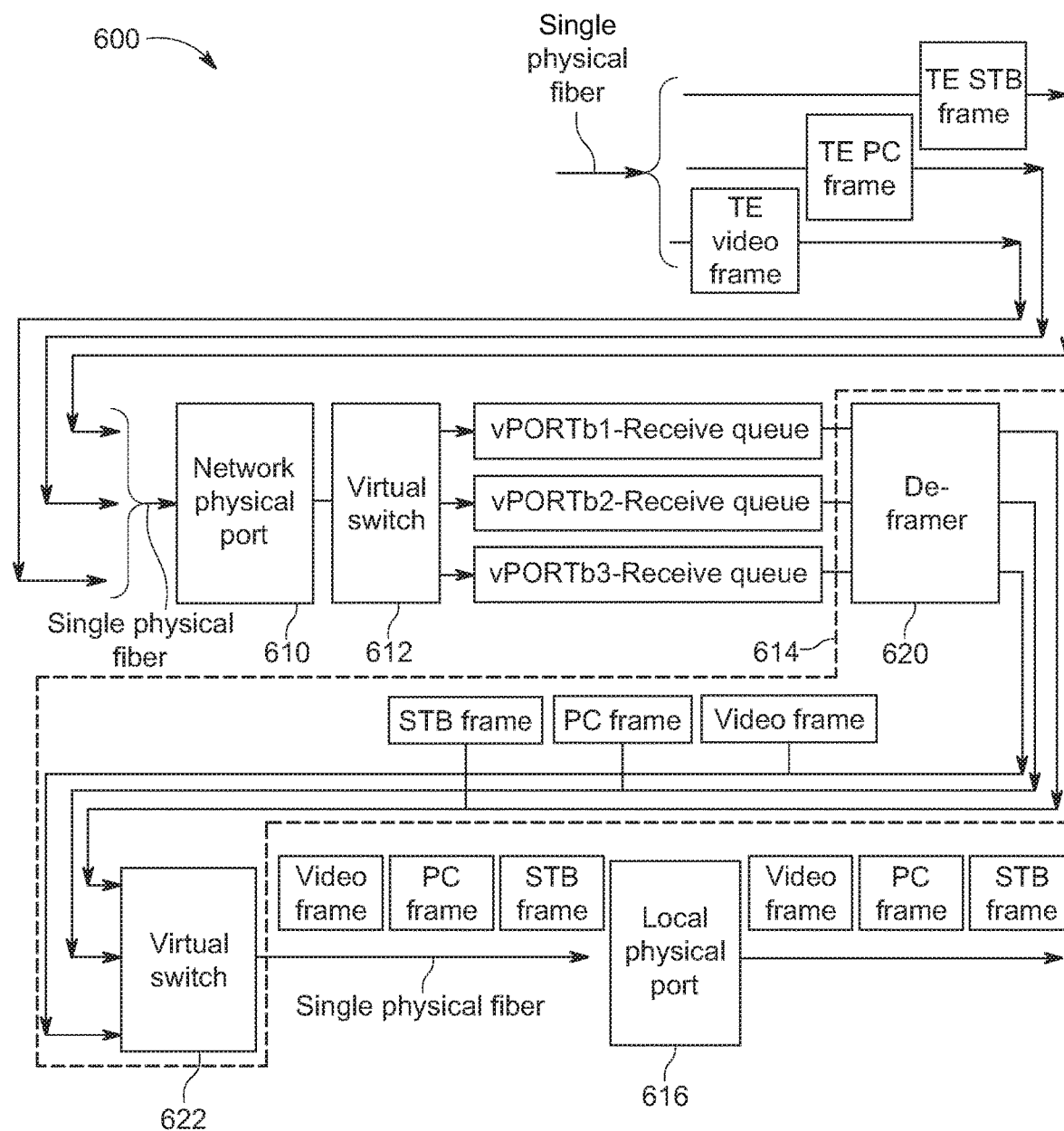
FIG. 6 is a block diagram illustrating an example of a receive circuit 600 of a virtual exit device in accordance with the present invention.

FIG. 6 shows a block diagram that illustrates an example of a receive circuit 600 of a virtual exit device in accordance with the present invention. (The virtual entry device also includes a receive circuit, while the virtual exit device also includes a transmit circuit.) As shown in FIG. 6, virtual exit device 600 includes a network physical port 610 and a receive virtual switch 612 that is coupled to network physical port 610. Virtual switch 612 also includes a number of receive virtual ports vPORTb1-vPORTbn that are coupled to switch 612. Each receive virtual port vPORTb, in turn, includes a receive queue and a receive frame formatting circuit. Virtual exit device 600 further includes a de-framing circuit 614 that is coupled to each of the receive virtual ports vPORTb, and a local physical port 616 that is coupled to de-framing circuit 614.

Figure 7:
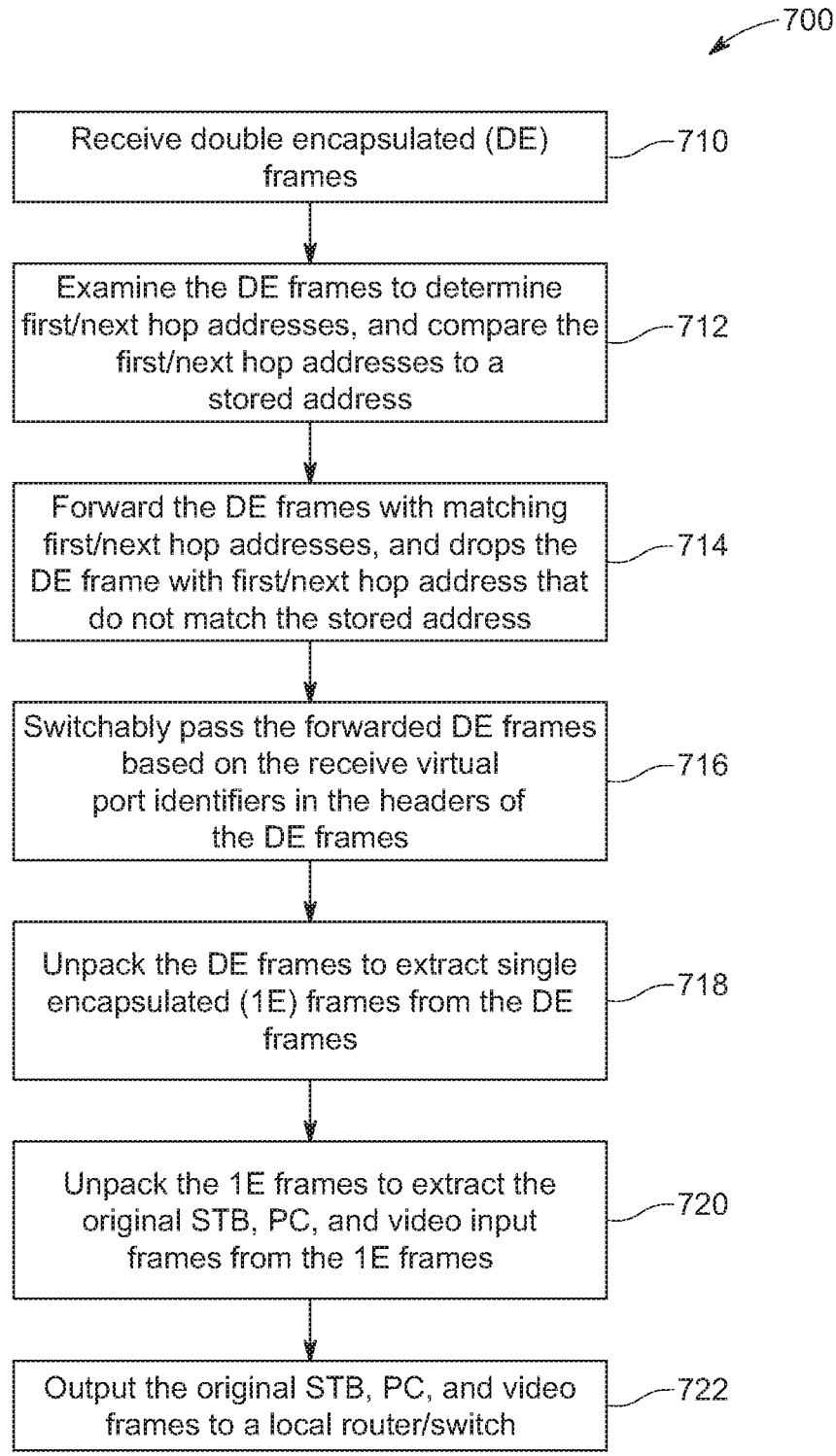
FIG. 7 is a flow chart illustrating an example of a method 700 of operating receive circuit 600 in accordance with the present invention.

FIG. 7 shows a flow chart that illustrates an example of a method 700 of operating receive circuit 600 in accordance with the present invention. As shown in FIG. 7, method 700 begins at 710 with network physical port 610 receiving the double encapsulated (DE) frames, e.g., the SE frames, which each has a header that includes first/next hop addresses and receive virtual port identifiers.

Next, method 700 moves to 712 where network physical port 610 examines the DE frames to determine first/next hop addresses, and compares the first/next hop addresses to a stored address. After this, method 700 moves to 714 where network physical port 610 forwards the DE frames with matching first/next hop addresses, and drops the DE frames with first/next hop addresses that do not match the stored address.

After this, method 700 moves to 716 where receive virtual switch 612 switchably passes the forwarded DE frames based on the receive virtual port identifiers in the headers of the DE frames. Method 700 then moves to 718 where the receive virtual ports vPORTb1-vPORTbn unpack the DE frames to extract single encapsulated (1E) frames, e.g., the FE frames, from the DE frames such that each receive virtual port vPORTb unpacks a DE frame to extract a 1E frame.

Following this, method 700 moves to 720 where de-framing circuit 614 unpacks the 1E frames to extract the original STB, PC, and video input frames from the 1E frames. The original STB, PC, and video input frames have a number of frame types. Further, each input frame has a header that identifies a destination router/switch. Method 700 then moves to 722 where de-framing circuit 614 forwards the STB, PC, and video frames to local physical port 616, which outputs the original STB, PC, and video frames to a remote router/switch, such as remote router/switch 122.

In the present example, virtual switch 612 receives a DE STB frame from network physical port 610, and determines that the destination virtual port is virtual port vPORTb1 from the destination virtual port number Dst_vID in the header of the DE STB frame. In addition, switch 612 determines a route to virtual port vPORTb1 from the static forwarding table, and then outputs the DE STB frame on a first virtual port line routed towards virtual port vPORTb1.

Similarly, virtual switch 612 receives a DE PC frame from network physical port 610, and determines that the destination virtual port is virtual port vPORTb2 from the destination virtual port number Dst_vID in the header of the ME PC frame. Further, switch 612 determines a route to virtual port vPORTb2 from the static forwarding table, and then outputs the DE PC frame on a second virtual port line routed towards virtual port vPORTb2.

In addition, virtual switch 612 receives a DE video frame from network physical port 610, and determines that the destination virtual port is virtual port vPORTb3 from the destination virtual port number Dst_vID in the header of the ME video frame. Switch 612 determines a route to virtual port vPORTb3 from the static forwarding table, and then outputs the DE video frame on a third virtual port line routed towards virtual port vPORTb3.

The virtual ports vPORTb1-vPORTbn receive the DE frames, and unpack the DE frames to extract the 1E frames, such as a FE STB frame, a FE PC frame, and a FE video frame, from the DE frames. In the FIG. 6 example, the receive queue of a first virtual port vPORTb1 receives a DE STB frame, while the frame formatting circuit of virtual port vPORTb1 unpacks the DE STB frame to extract the 1E STB frame, which has a header that includes the identity of the virtual exit device.

Similarly, the receive queue of a second virtual port vPORTb2 receives a DE PC frame, while the frame formatting circuit of virtual port vPORTb2 unpacks the DE PC frame to extract the 1E PC frame, which has a header that includes the identity of the virtual exit device. In addition, the receive queue of a third virtual port vPORTb3 receives a DE video frame, while the frame formatting circuit of virtual port vPORTb3 unpacks the DE video frame to extract the 1E video frame, which has a header that includes the identity of the virtual exit device.

De-framing circuit 614 receives the plurality of 1E frames, e.g., FE frames, and extracts the original STB, PC, and video input frames from the 1E frames. The input frames have a number of frame types, e.g., STB, PC, video. Each input frame has a header that includes the identity of a remote router/switch. For each received FE frame, de-framing circuit 614 unpacks a 1E frame to extract an input frame, determines an identity of a remote router/switch from the header of the input frame, and outputs the input frame to a local physical port 616, which outputs the input frame to a remote router/switch, such as remote router/switch 122.

As shown in FIG. 6, de-framing circuit 614 includes a de-framer 620 and a virtual switch 622 that is coupled to de-framer 620. In operation, de-framer 620 receives the 1E frames from the plurality of receive virtual ports vPORTb1-vPORTbn, and unpacks the 1E frames to extract the original input frames, e.g., the STB frame, the PC frame, and the video frame, and forwards the STB frame, the PC frame, and the video frame to virtual switch 622.

In the FIG. 6 example, de-framer 620 receives the 1E STB frame from receive virtual port vPORTb1, unpacks the 1E frame to extract the STB frame, and forwards the STB frame to virtual switch 622. Similarly, de-framer 620 receives the 1E PC frame from receive virtual port vPORTb2, unpacks the 1E frame to extract the PC frame, and forwards the PC frame to virtual switch 622. In addition, de-framer 620 receives the 1E video frame from receive virtual port vPORTb3, unpacks the 1E frame to extract the video frame, and forwards the video frame to virtual switch 622. De-framer 620 can utilize the same or different protocol as framer 222.

Virtual switch 622 cycles through the outputs of de-framer 620 sequentially receiving and forwarding output frames to local physical port 616. In the present example, virtual switch 622 receives the STB frame from de-framer 620, detects the MAC address of a remote router/switch, and outputs the STB frame to local physical port 616. Similarly, virtual switch 622 receives the PC frame from de-framer 620, detects the MAC address of a remote router/switch, and outputs the PC frame to local physical port 616. In addition, virtual switch 622 receives the video frame from de-framer 620, detects the MAC address of a remote router/switch, and outputs the video frame to local physical port 616. Local physical port 616, in turn, outputs the frames to a remote router/switch.

The FIG. 6 example illustrates de-framing circuit 614 with a parallel-to-parallel de-framer 620 followed by a parallel-to-serial virtual switch 622. De-framing circuit 614 can be alternately realized with other circuit arrangements. For example, de-framing circuit 614 can be implemented with a serial-to-parallel virtual switch that is coupled to the virtual ports vPORTb1-vPORTbn followed by a serial-to-serial framer.

Figure 8:
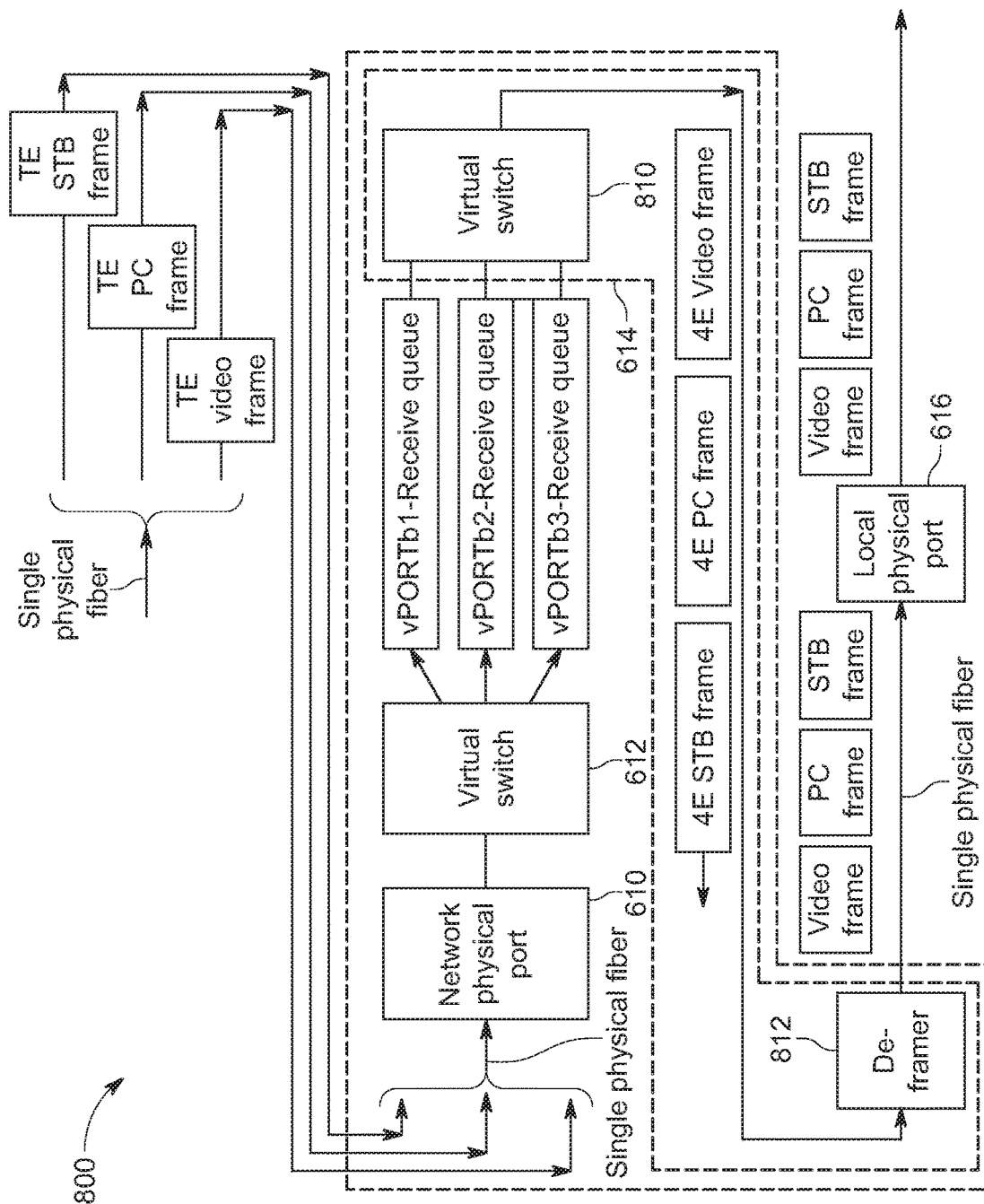
FIG. 8 is a block diagram illustrating an example of a receive circuit 800 in accordance with an alternate embodiment of the present invention.

FIG. 8 shows a block diagram that illustrates an example of a virtual exit device 800 in accordance with an alternate embodiment of the present invention. Virtual exit device 800 is similar to virtual exit device 600 and, as a result, utilizes the same reference numerals to designate the structures that are common to both devices.

As shown in FIG. 8, virtual exit device 800 differs from virtual exit device 600 in that framing circuit 614 of virtual exit device 800 includes a parallel-to-serial virtual switch 810 that is coupled to the virtual ports vPORTb1-vPORTbn, followed by a serial-to-serial de-framer 812. The implementations of framing circuit 212 and de-framing circuit 614 can be interchanged. For example, virtual entry device 110 can utilize framing circuit 212 implemented with virtual switch 220 and framer 222, while virtual exit device can utilize de-framing circuit 614 virtual switch 810 and de-framer 812.

In a further alternate embodiment, virtual switch 810 and de-framer 812 can be physically separated, with de-framer 812 being incorporated into a local router/switch.

Figure 9:
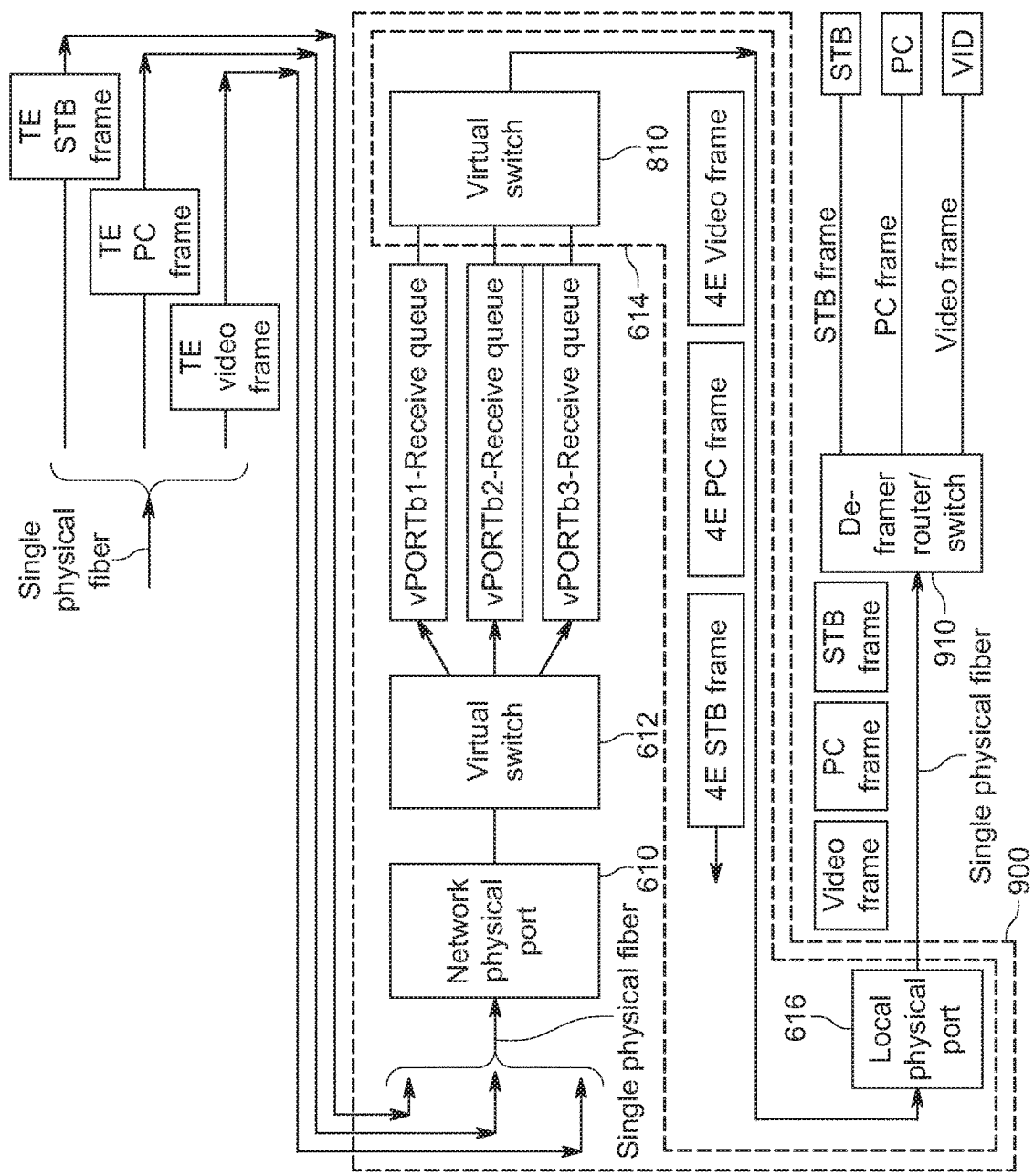
FIG. 9 is a block diagram illustrating an example of a receive circuit 900 in accordance with an alternate embodiment of the present invention.

FIG. 9 shows a block diagram that illustrates an example of a receive circuit 900 in accordance with the present invention. Receive circuit 900 is similar to receive circuit 800 and, as a result, utilizes the same reference numerals to designate the structures that are common to both circuit 800 and circuit 900. As shown in the example illustrated in FIG. 9, a local de-framer router/switch 910 is utilized in receive circuit 900 in lieu of a local router switch.

In addition to transferring frames of data across the virtual network, the hops across the virtual network can be tested by generating test SE frames. A transmit virtual port vPORTa determines a next hop in the virtual network to the virtual exit device that ends the link under test. Following this, the transmit virtual port vPORTa generates a test SE frame with a header that identifies the frame as a test frame, and the virtual exit device that ends the link to be tested.

Virtual switch 214 passes the test SE frame to a network physical port in the manners described above, which transmits the test SE frame. The test SE frame arrives at the virtual exit device in the manner described above, where a receive virtual port vPORTb unpacks the test SE frame in the manner described above to extract the testing information. The receive virtual port vPORTb can then determine frame latency, frame lost rate, and live/shutdown status from the test SE frames which, in turn, can be utilized to determine a quality of service (QoS) measure.

Figure 10A:
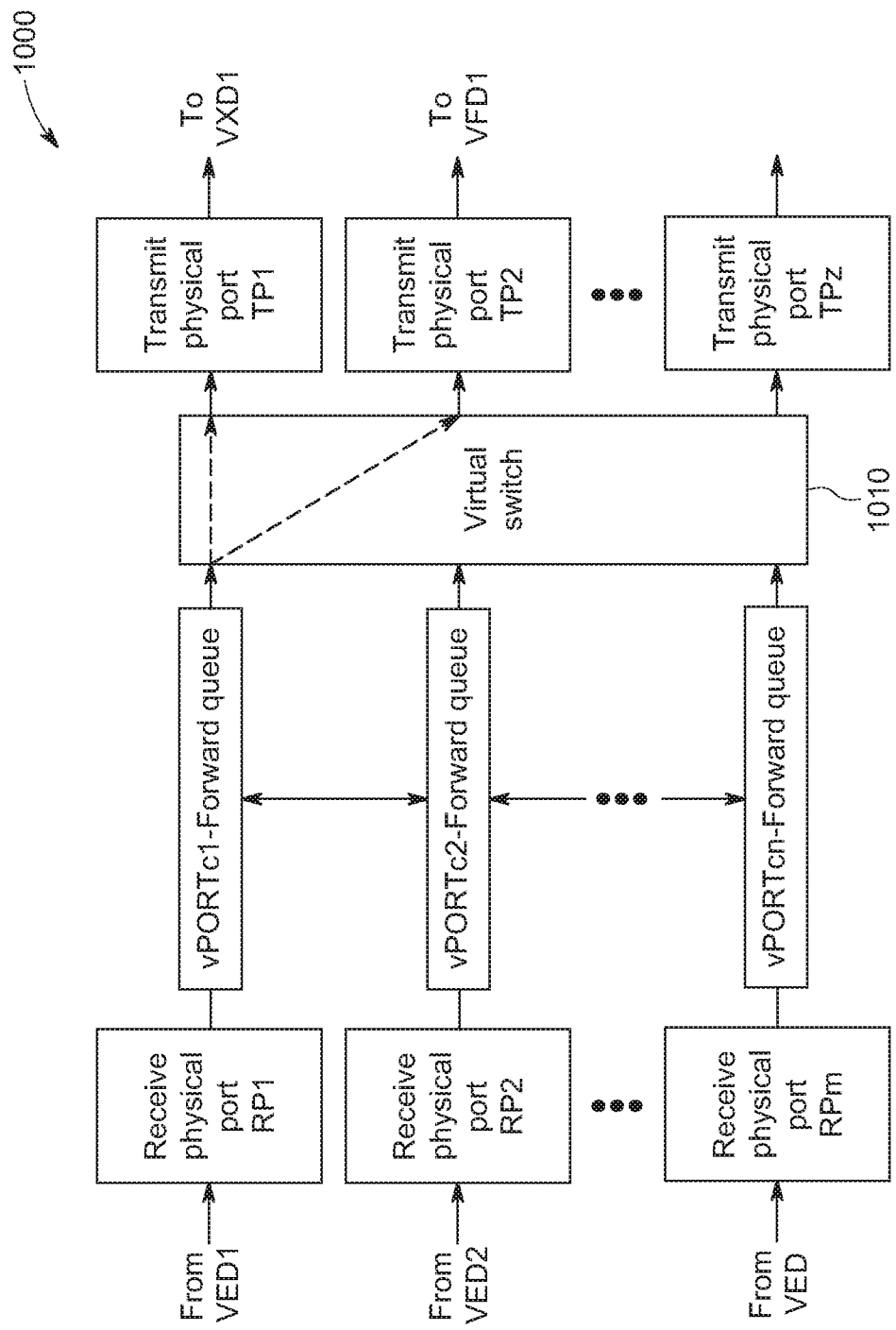
FIG. 10A is a block diagram illustrating an example of a virtual forwarding device 1000 in accordance with the present invention.

FIG. 10A shows a block diagram that illustrates an example of a virtual forwarding device 1000 in accordance with the present invention. As shown in FIG. 10A, virtual forwarding device 1000 includes a number of receive physical ports RP1-RPm, and a number of forwarding virtual ports vPORTc1-vPORTcn that are coupled to the receive physical ports RP1-RPm. Each forwarding virtual port vPORTc, in turn, includes a forwarding frame formatting circuit for packing and unpacking frames, and a forwarding queue that holds frame data during the packing and unpacking. Virtual forwarding device 1000 further includes a virtual switch 1010 that is coupled to each of the forwarding virtual ports vPORTc, and a number of transmit physical ports TP1-TPz that are coupled to virtual switch 1010.

Figure 10B:
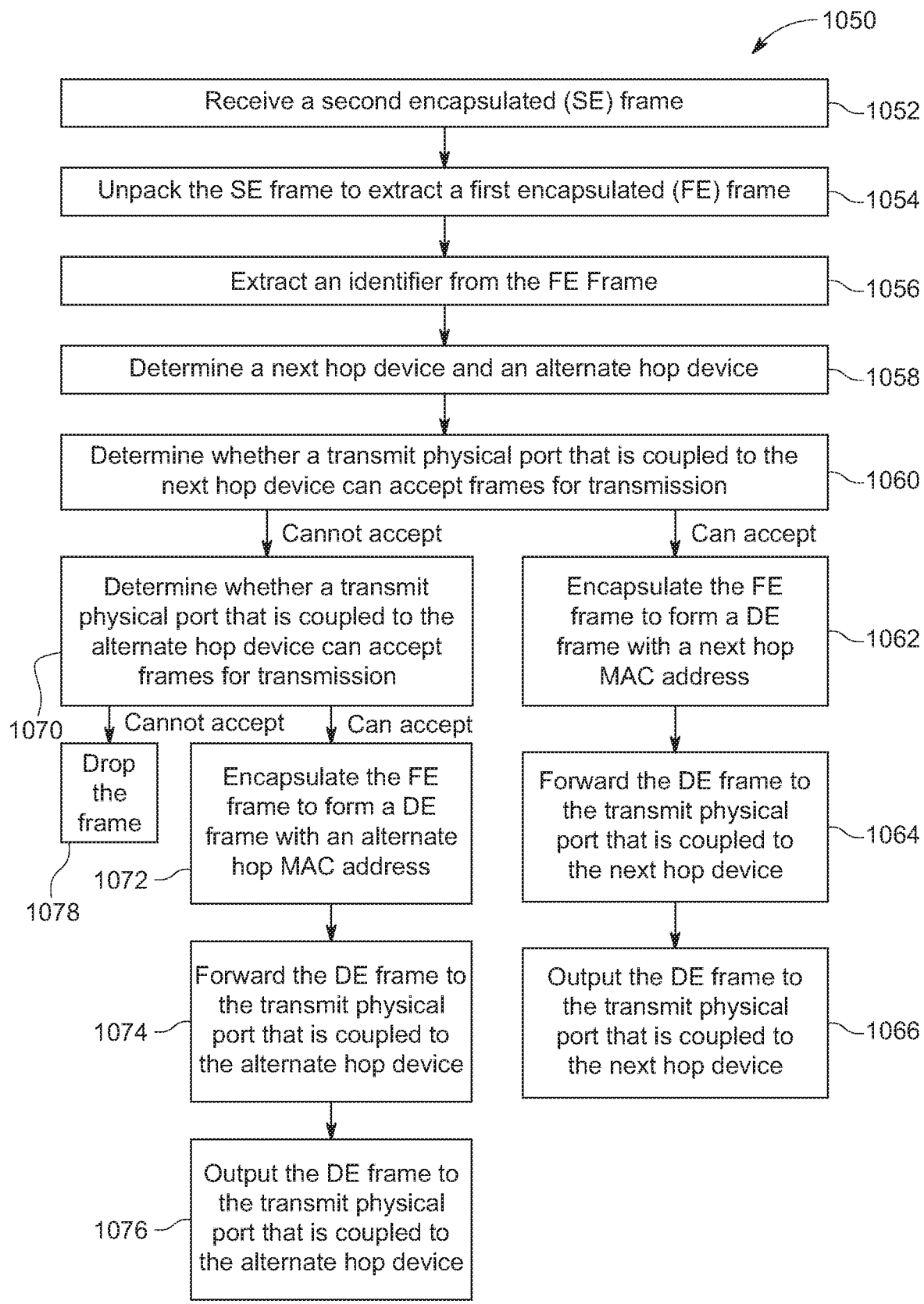
FIG. 10B is a flow chart illustrating an example of a method 1050 of operating virtual forwarding device 1000 in accordance with the present invention.

FIG. 10B shows a flow chart that illustrates an example of a method 1050 of operating virtual forwarding device 1000 in accordance with the present invention. As shown in FIG. 10B, method 1050 begins at 1052 by receiving a second encapsulated (SE) frame. For example, forwarding virtual port vPORTc1 can receive a SE frame from virtual entry device VED1 via receive physical port RP1.

Next, method 1050 moves to 1054 to unpack the SE frame to extract a first encapsulated frame (FE), and then moves to 1056 to extract an identifier from the FE frame. For example, forwarding virtual port vPORTc1 can extract a FE frame from an unpacked SE frame, and then extract the identifier as the MAC address of a virtual exit device.

Following this, method 1050 moves to 1058 to determine a next hop device and an alternate hop device from the identifier. For example, forwarding virtual port vPORTc1 can input the MAC address of the virtual exit device VXD1 (the identifier) into a lookup table. As shown in the LOOKUP TABLE, when the virtual exit device VXD1 is input into the table, the MAC address of a next hop device and the MAC address of an alternate hop device can be determined. (The lookup table can alternately include the MAC addresses of a number of additional alternate hop devices.)

| LOOKUP TABLE | | |
|---|---|---|
| MAC Addr VXD Device | MAC Addr Next Hop Device | MAC Addr Altnate Hop Device |
| VXD1 | VXD1 | VFD2 |
| VXD2 | VXD2 | |
| VXD | | |

After this, method 1050 moves to 1060 to determine whether the transmit physical port that is coupled to the next hop device can accept frames for forwarding. When the rate that frames are forwarded to a transmit physical port is greater than the rate than the transmit physical port can physically output the frames to the next hop device, the transmit physical port asserts a hold signal that prevents the transmit physical port from receiving additional frames. For example, forwarding virtual port vPORTc1 can determine whether transmit physical port TP1, which is coupled to the next hop (virtual exit) device VXD1, can accept frames for forwarding.

When the transmit physical port can accept frames for forwarding, method 1050 moves to 1062 where the virtual forwarding vPORTc packs or encapsulates the FE frame to form a double encapsulated (DE) frame with a next hop MAC address replacing the first hop MAC address. The DE frame, in turn, has a field that identifies a next hop, and a field that includes the FE frame. For example, when forwarding virtual port vPORTc1 determines that transmit physical port TP1 can accept frames for transmission, forwarding virtual port vPORTc1 packs or encapsulates the FE frame to form a DE frame, which has a field that identifies virtual exit device VXD1.

Following this, method 1050 moves to 1064 where virtual switch 272 forwards the DE frame with the next hop MAC address to the transmit physical port that is coupled to the next hop device, and then to 1066 where the transmit physical port outputs the DE frame. For example, virtual switch 272 can forward the DE frame from forwarding virtual port vPORTc to transmit physical port TP1, which then transmits the DE frame to virtual exit device VXD1.

On the other hand, when the transmit physical port cannot accept frames for forwarding, method 1050 moves to 1070 to determine whether the transmit physical port coupled to the alternate hop device can accept frames for forwarding. For example, the forwarding virtual port vPORTc1 can determine whether the transmit physical port TP2 coupled to the virtual forwarding device VFD2 can accept frames for forwarding.

When the transmit physical port can accept frames for forwarding, method 1050 moves to 1072 where the forwarding virtual port vPORTc packs or encapsulates the FE frame to form a DE frame with an alternate hop MAC address replacing the first hop MAC address. The DE frame, in turn, has a field that identifies an alternate hop, and a field that includes the FE frame. For example, when forwarding virtual port vPORTc1 determines that transmit physical port TP1 can accept frames for transmission, forwarding virtual port vPORTc1 packs or encapsulates the FE frame to form a DE frame, which has a field that identifies virtual forwarding device VFD1.

The DE frame, in turn, has a field that identifies an alternate hop, and a field that includes the FE frame. For example, when forwarding virtual port vPORTc1 determines that transmit physical port TP2 can accept frames for transmission, forwarding virtual port vPORTc1 packs or encapsulates the FE frame to form a DE frame, which has a field that identifies virtual forwarding device VFD2 as the next hop.

Following this, method 1050 moves to 1074 where virtual switch 272 forwards the DE frame with the alternate MAC address to the transmit physical port coupled to the alternate hop device, and then to 1076 where the transmit physical port outputs the DE frame to the alternate hop device. For example, virtual switch 272 can forward the DE frame from forwarding virtual port vPORTc to transmit physical port TP2, which then transmits the DE frame to virtual forwarding device VFD2. When the transmit physical port cannot accept frames for forwarding, method 1050 moves to 1078 where the forwarding virtual port vPORTc drops the frame. (When the lookup table provides additional alternate devices, method 360 evaluates the other devices before dropping the frame.)

Virtual forwarding device VFD2 functions in the same manner as virtual forwarding device VFD1. Virtual forwarding device VFD2 receives the SE frame, unpacks the frame, identifies a next hop device and an alternate hop device, and determines if the transmit physical port associated with the next hop device can accept frames for transmission.

When the transmit physical port associated with the next hop can accept frames for transmission, virtual forwarding device VFD2 packs the FE frame to form a DE frame, which the virtual switch forwards to a transmit physical port in virtual forwarding device VFD2. When the physical port associated with the next hop cannot accept frames for transmission, virtual forwarding device VFD2 determines if the transmit physical port associated with the device identified by the alternate MAC address can accept frames for transmission.

When the transmit physical port associated with the device identified by the alternate MAC address can accept frames for transmission, virtual forwarding device VFD2 packs the FE frame to form a DE frame, which the virtual switch forwards to the transmit physical port. For example, when the transmit physical port TP2 coupled to a virtual forwarding device VFD can accept frames for transmission, virtual forwarding device VFD2 packs the FE frame to form a DE frame, which the virtual switch forwards to transmit physical port TP2.

When the transmit physical port associated with the device identified by the alternate MAC address cannot accept frames for transmission, the method drops the frame, or can continue checking second, third, and so on alternate MAC addresses, depending on what is provided in the lookup table, until a transmit physical port accepting frames for transmission is found or the frame is dropped.

Figure 11:
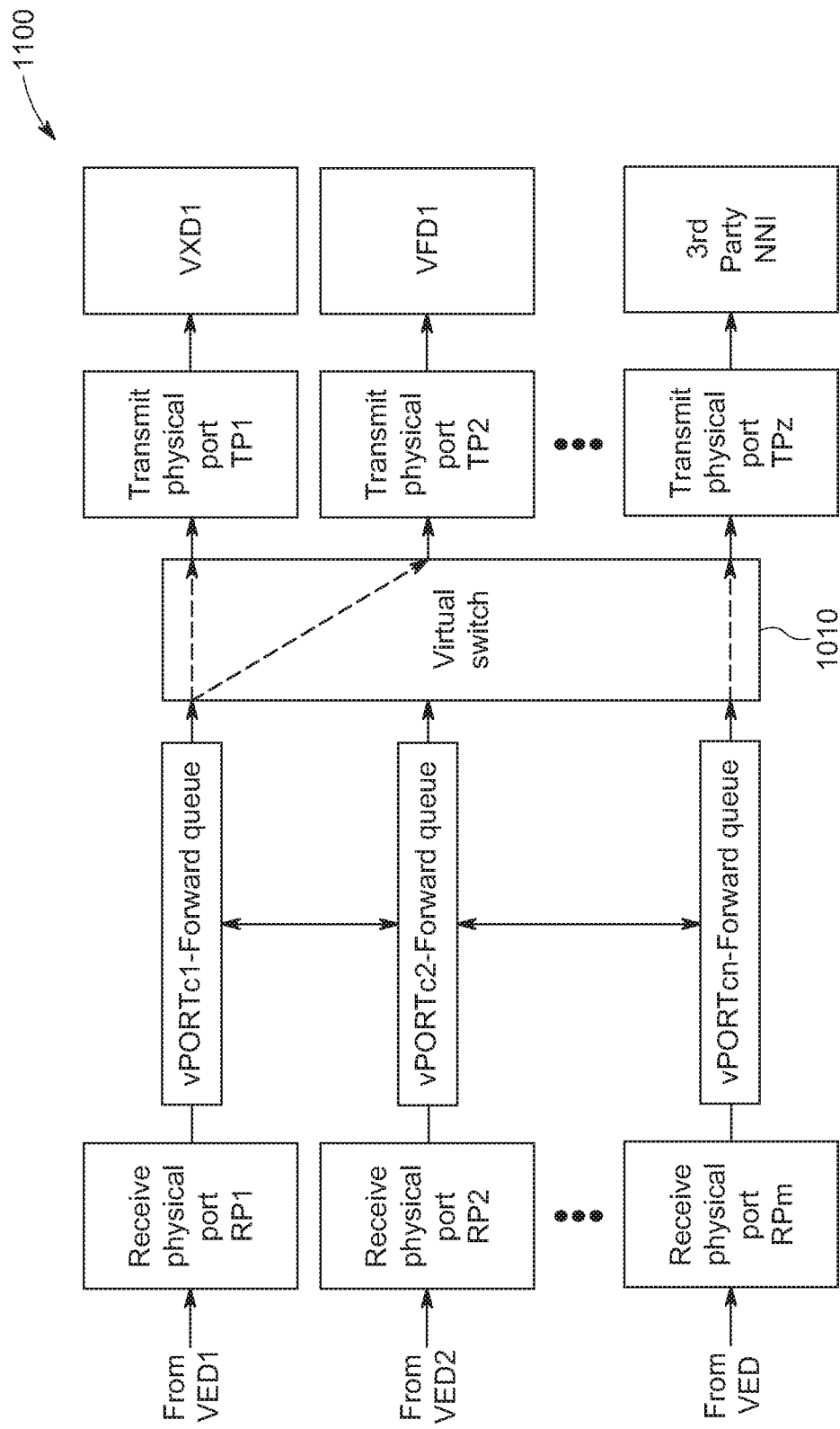
FIG. 11 is a block diagram illustrating an example of a virtual forwarding device 1100 in accordance with the present invention.

FIG. 11 shows a block diagram that illustrates an example of a virtual forwarding device 1100 in accordance with the present invention. Virtual forwarding device 1100 is similar to virtual forwarding device 1000 and, as a result, utilizes the same reference numerals to designate the structures that are common to both devices.

As shown in FIG. 11, virtual forwarding device 1100 differs from virtual forwarding device 1000 in that the forwarding frame formatting circuit of forwarding virtual port vPORTcn allows unpacked FE frames to be forwarded to a third-party network-to-network (NNI) device via transmit physical port TPz for transmission across a third-party network when necessary. The forwarding virtual port vPORTcn provides the unpacked FE frames with a conventional format, such as PBB-TE format.

In addition to transferring frames of data across the virtual network, the hops across the virtual network can be tested by generating test SE frames. A transmit virtual port vPORTa determines a first hop in the virtual network to the virtual exit device that ends the link under test. Following this, the transmit virtual port vPORTa generates a test SE frame with a header that identifies the frame as a test frame, and the virtual exit device that ends the link to be tested.

The test SE frame is passed to a network physical port in the manners described above, which transmits the test SE frame. The test SE frame arrives at the virtual exit device in the manner described above, where a receive virtual port vPORTb unpacks the test SE frame in the manner described above to extract the testing information. The receive virtual port vPORTb can then determine frame latency, frame lost rate, and live/shutdown status from the test SE frames which, in turn, can be utilized to determine a quality of service (QoS) measure.

Figure 12:
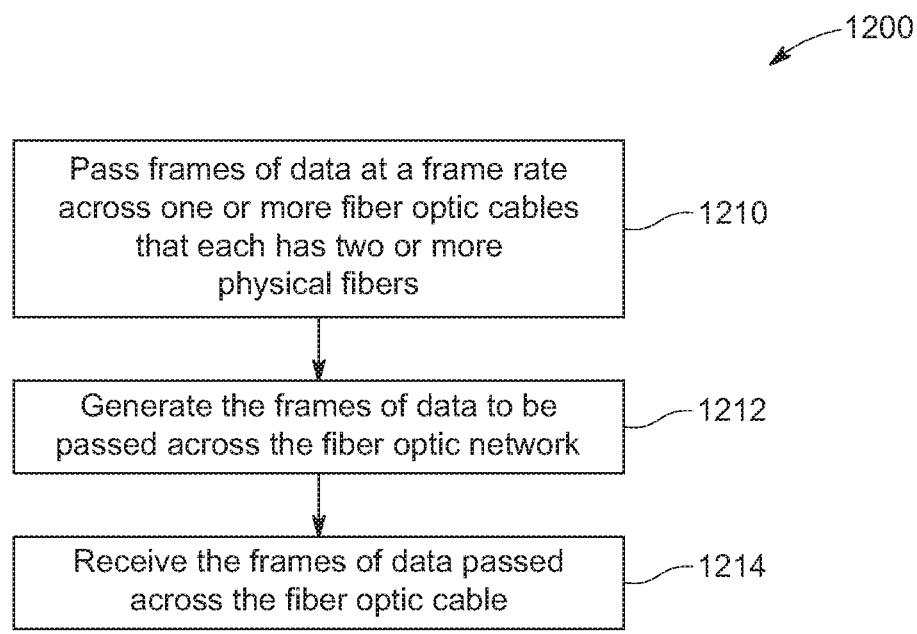
FIG. 12 is a flow chart illustrating an example of a method 1200 of forming a virtual network in accordance with the present invention.

FIG. 12 is a flow chart illustrating an example of a method 1200 of forming a virtual network in accordance with the present invention. As shown in the FIG. 12 example, method 1200 begins at 1210 by passing frames of data at a frame rate across one or more fiber optic cables that each has two or more physical fibers.

When the frame rate of the frames of data is greater than a maximum frame rate of a first physical fiber in a fiber optic cable, the passing includes passing a first number of the frames of data over the first physical fiber at a first data rate that is equal to or less than a maximum data rate of the first physical fiber. The passing also includes passing a second number of the frames of data over a second physical fiber at a second data rate that is equal to or less than a maximum data rate of the second physical fiber.

When the frame rate of the frames of data is equal to or less than the frame rate of the first physical fiber in the fiber optic cable, the passing includes serially passing a pair of frames of data through the first physical fiber such that the pair of frames include data from a plurality of sources.

Method 1200 next moves to 1212 to generate the frames of data to be passed across the fiber optic network. In a first embodiment, the frames of data are generated by receiving frames of data from a source device at the frame rate greater than the maximum frame rate to form received frames of data, followed by splitting the received frames of data and the frame rate greater than the maximum frame rate into a first number of received frames of data with a first data rate that is equal to or less than the maximum data rate of a first physical fiber, and a second number of received frames of data with a second data rate that is equal to or less than the maximum data rate of a second physical fiber.

For example, if two physical fibers each has a maximum data rate of 100 Gbps, and the customer data runs at 200 Gbps, then a fiber optic cable can be formed to split the customer data and data rate of 200 Gbps, which is greater than the 100 Gbps highest maximum data rate of the two or more physical fibers, by passing 100 Gbps on both a first physical fiber and a second physical fiber.

Following this, the frames of data are generated by determining a remote device from a received frame of data, determining a virtual exit device from the remote device, and first encapsulating the received frame of data to form a first encapsulated frame that has a header that identifies the virtual exit device.

Next, the frames of data are generated by determining the virtual exit device from the first encapsulated frame, determining a first hop device from the virtual exit device, and second encapsulating the first encapsulated frame to form a second encapsulated frame that has a header that identifies the first hop device.

In a second embodiment, the frames of data are generated by receiving first frames of data from a first source at a first frame rate, and second frames of data from a second source at a second frame rate. Following this, the frames of data are generated by combining data from a first frame from the first source with data from a second frame from the second source to form a combined frame of data.

After this, the frames of data are generated by determining a remote device from the first frame from the first source, determining a virtual exit device from the remote device, and first encapsulating the combined frame of data to form a first encapsulated frame that has a header that identifies the virtual exit device.

Next, the frames of data are generated by determining the virtual exit device from the first encapsulated frame, determining a first hop device from the virtual exit device, and second encapsulating the first encapsulated frame to form a second encapsulated frame that has a header that identifies the first hop device.

In a third embodiment, the frames of data are generated by receiving first frames of data from a first source at a first frame rate, and second frames of data from a second source at a second frame rate, and determining a remote device from a first frame of data from the first source, determining a virtual exit device from the remote device.

After this, the frames of data are generated by encapsulating a first frame of data from the first source to form a first encapsulated frame that has a header that identifies the virtual exit device, and encapsulating a second frame of data from the second source to form a second encapsulated frame that has a header that identifies the virtual exit device.

Next, the frames of data are generated by determining the virtual exit device from the first encapsulated frame, determining a first hop device from the virtual exit device, encapsulating the first encapsulated frame to form a third encapsulated frame having a header that identifies the first hop device, and encapsulating the second encapsulated frame to form a fourth encapsulated frame having a header that identifies the first hop device.

Following this, the frames of data are generated by outputting a number of third encapsulated frames and a number of fourth encapsulated frames such that a combined frame rate of the third encapsulated frames and the fourth encapsulated frames are equal to or less than the maximum frame rate of the first fiber.

Referring again to FIG. 12, method 1200 next moves to 1214 to receive the frames of data passed across the fiber optic cable. In a first embodiment, the frames of data are received by unpacking the second encapsulated frame to extract the first encapsulated frame and the identity of the virtual exit device, and determining whether the first hop device is the virtual exit device. After this, the frames are received by unpacking the first encapsulated frame to extract the received frame of data when the first hop device is the virtual exit device, and determining a next hop device from the identity of the virtual exit device when the first hop device is not the virtual exit device.

When the next hop device is a virtual forwarding device, the first encapsulated frame is encapsulated to form a third encapsulated frame that has a header that identifies the virtual forwarding hop device. When the next hop device is a network-to-network interface device, the first encapsulated frame is forwarded to the network-to-network interface device.

Reference has now been made in detail to the various embodiments of the present disclosure, examples of which are illustrated in the accompanying drawings. While described in conjunction with the various embodiments, it will be understood that these various embodiments are not intended to limit the present disclosure. On the contrary, the present disclosure is intended to cover alternatives, modifications and equivalents, which may be included within the scope of the present disclosure as construed according to the claims.

Furthermore, in the preceding detailed description of various embodiments of the present disclosure, numerous specific details are set forth in order to provide a thorough understanding of the present disclosure. However, it will be recognized by one of ordinary skill in the art that the present disclosure may be practiced without these specific details or with equivalents thereof. In other instances, well-known methods, procedures, components, and circuits have not been described in detail so as not to unnecessarily obscure aspects of various embodiments of the present disclosure.

It is noted that although a method may be depicted herein as a sequence of numbered operations for clarity, the numbering does not necessarily dictate the order of the operations. It should be understood that some of the operations may be skipped, performed in parallel, or performed without the requirement of maintaining a strict order of sequence.

The drawings showing various embodiments in accordance with the present disclosure are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the various embodiments in accordance with the present disclosure can be operated in any orientation.

Some portions of the detailed descriptions are presented in terms of procedures, logic blocks, processing, and other symbolic representations of operations on data bits within a computer memory. These descriptions and representations are used by those skilled in the data processing arts to effectively convey the substance of their work to others skilled in the art.

In the present disclosure, a procedure, logic block, process, or the like, is conceived to be a self-consistent sequence of operations or instructions leading to a desired result. The operations are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "generating," "determining," "assigning," "aggregating," "utilizing," "virtualizing," "processing," "accessing," "executing," "storing," or the like, refer to the action and processes of a computer system, or similar electronic computing device or processor.

The computing system, or similar electronic computing device or processor manipulates and transforms data represented as physical (electronic) quantities within the computer system memories, registers, other such information storage, and/or other computer readable media into other data similarly represented as physical quantities within the computer system memories or registers or other such information storage, transmission or display devices.

The technical solutions in the embodiments of the present application have been clearly and completely described in the prior sections with reference to the drawings of the embodiments of the present application. It should be noted that the terms "first," "second," and the like in the description and claims of the present invention and in the above drawings are used to distinguish similar objects and are not necessarily used to describe a specific sequence or order. It should be understood that these numbers may be interchanged where appropriate so that the embodiments of the present invention described herein can be implemented in orders other than those illustrated or described herein.

The functions described in the method of the present embodiment, if implemented in the form of a software functional unit and sold or used as a standalone product, can be stored in a computing device readable storage medium. Based on such understanding, a portion of the embodiments of the present application that contributes to the prior art or a portion of the technical solution may be embodied in the form of a software product stored in a storage medium, including a plurality of instructions for causing a computing device (which may be a personal computer, a server, a mobile computing device, or a network device, and so on) to perform all or part of the steps of the methods described in various embodiments of the present application. The foregoing storage medium includes: a USB drive, a portable hard disk, a read-only memory (ROM), a random-access memory (RAM), a magnetic disk, an optical disk, and the like, which can store program code.

The various embodiments in the specification of the present application are described in a progressive manner, and each embodiment focuses on its difference from other embodiments, and the same or similar parts between the various embodiments may be referred to another case. The described embodiments are only a part of the embodiments, rather than all of the embodiments of the present application. All other embodiments obtained by a person of ordinary skill in the art based on the embodiments of the present application without departing from the inventive skills are within the scope of the present application.

The above description of the disclosed embodiments enables a person skilled in the art to make or use the present application. Various modifications to these embodiments are obvious to a person skilled in the art, and the general principles defined herein may be implemented in other embodiments without departing from the spirit or scope of the present application. Therefore, the present application is not limited to the embodiments shown herein, but the broadest scope consistent with the principles and novel features disclosed herein.

What is claimed is:

1. A method of forming a virtual network, the method comprising:
passing frames of data at a frame rate across one or more fiber optic cables that each has two or more physical fibers,
when the frame rate of the frames of data is greater than a maximum frame rate of a first physical fiber in a fiber optic cable, the method further comprises:
passing a first number of the frames of data over the first physical fiber at a first data rate that is equal to or less than a maximum data rate of the first physical fiber; and
passing a second number of the frames of data over a second physical fiber at a second data rate that is equal to or less than a maximum data rate of the second physical fiber; and
when the frame rate of the frames of data is equal to or less than the maximum frame rate of the first physical fiber in the fiber optic cable, the method comprises:
passing a pair of frames of data in sequence through the first physical fiber such that the pair of frames include data from a plurality of sources;
generating a test frame having a header that identifies a virtual exit device under test, and transmitting the test frame to the virtual exit device under the test; and
receiving the test frame by the virtual exit device, unpacking the test frame, and determining one or more measures of status from the unpacked test frame.

2. The method of claim 1, further comprising generating the frames of data to be passed across the fiber optic cable.

3. The method of claim 2, wherein generating the frames of data includes:
receiving the frames of data from a source device at the frame rate greater than the maximum frame rate; and
splitting the received frames of data at the frame rate greater than the maximum frame rate into a first number of received frames of data with the first data rate that is equal to or less than the maximum data rate of the first physical fiber, and a second number of received frames of data with the second data rate that is equal to or less than the maximum data rate of the second physical fiber.

4. The method of claim 3, wherein generating the frames of data further includes:
determining a remote device from a received frame of data;
determining a virtual exit device from the remote device; and
first encapsulating the received frame of data to form a first encapsulated frame having a header that identifies the virtual exit device.

5. The method of claim 4, wherein generating the frames of data further includes:
determining the virtual exit device from the first encapsulated frame;
determining a first hop device from the virtual exit device; and
second encapsulating the first encapsulated frame to form a second encapsulated frame having a header that identifies the first hop device.

6. The method of claim 5, further comprising:
receiving the frames of data passed across the fiber optic cable;
unpacking the second encapsulated frame to extract the first encapsulated frame and the identity of the virtual exit device;
determining whether the first hop device is the virtual exit device;
when the first hop device is the virtual exit device, unpacking the first encapsulated frame to extract the received frames of data; and
when the first hop device is not the virtual exit device, determining a next hop device from the identity of the virtual exit device.

7. The method of claim 6, further comprising:
when the next hop device is a virtual forwarding device, encapsulating the first encapsulated frame to form a third encapsulated frame having a header that identifies the virtual forwarding device; and
when the next hop device is a network-to-network interface device, forwarding the first encapsulated frame to the network-to-network interface device.

8. The method of claim 2, wherein generating the frames of data includes:
receiving first frames of data from a first source at a first frame rate, and second frames of data from a second source at a second frame rate; and
combining data from a first frame from the first source with data from a second frame from the second source to form a combined frame of data.

9. The method of claim 8, wherein generating the frames of data further includes:
determining a remote device from the first frame from the first source;
determining a virtual exit device from the remote device; and
first encapsulating the combined frame of data to form a first encapsulated frame having a header that identifies the virtual exit device.

10. The method of claim 9, wherein generating the frames of data further includes:
determining the virtual exit device from the first encapsulated frame;
determining a first hop device from the virtual exit device; and
second encapsulating the first encapsulated frame to form a second encapsulated frame having a header that identifies the first hop device.

11. The method of claim 10, further comprising:
receiving the frames of data passed across the fiber optic cable;
unpacking the second encapsulated frame to extract the first encapsulated frame and the identity of the virtual exit device;
determining whether the first hop device is the virtual exit device;
when the first hop device is the virtual exit device, unpacking the first encapsulated frame to extract the combined frame of data; and
when the first hop device is not the virtual exit device, determining a next hop device from the identity of the virtual exit device.

12. The method of claim 11, further comprising:
when the next hop device is a virtual forwarding device, encapsulating the first encapsulated frame to form a third encapsulated frame having a header that identifies the virtual forwarding device; and when the next hop device is a network-to-network interface device, forwarding the first encapsulated frame to the network-to-network interface device.

13. The method of claim 2, wherein generating the frames of data includes:
   receiving first frames of data from a first source at a first frame rate, and second frames of data from a second source at a second frame rate;
   determining a remote device from a first frame of data from the first source;
   determining a virtual exit device from the remote device;
   encapsulating the first frame of data from the first source to form a first encapsulated frame having a header that identifies the virtual exit device; and
   encapsulating a second frame of data from the second source to form a second encapsulated frame having a header that identifies the virtual exit device.

14. The method of claim 13, wherein generating the frames of data further includes:
   determining the virtual exit device from the first encapsulated frame;
   determining a first hop device from the virtual exit device;
   encapsulating the first encapsulated frame to form a third encapsulated frame having a header that identifies the first hop device; and
   encapsulating the second encapsulated frame to form a fourth encapsulated frame having a header that identifies the first hop device.

15. The method of claim 14, wherein generating the frames of data further includes outputting a number of third encapsulated frames and a number of fourth encapsulated frames such that a combined frame rate of the third encapsulated frames and the fourth encapsulated frames are equal to or less than the maximum frame rate of the first optic fiber.

16. The method of claim 15, further comprising:
   receiving the frames of data passed across the fiber optic cable;
   unpacking the third encapsulated frame to extract the first encapsulated frame and the identity of the virtual exit device;
   determining whether the first hop device is the virtual exit device;
   when the first hop device is the virtual exit device, unpacking the first encapsulated frame to extract the first frame of data from the first source;
   when the first hop device is not the virtual exit device, determining a next hop device from the identity of the virtual exit device;
   when the next hop device is a virtual forwarding device, encapsulating the first encapsulated frame to form a fifth encapsulated frame having a header that identifies the virtual forwarding device; and
   when the next hop device is a network-to-network interface device, forwarding the first encapsulated frame to the network-to-network interface device.

\* \* \* \* \*